US 11,619,872 B2

(12) United States Patent
Akiyama

(10) Patent No.: US 11,619,872 B2
(45) Date of Patent: Apr. 4, 2023

(54) LIGHT SOURCE DEVICE AND PROJECTOR

(71) Applicant: SEIKO EPSON CORPORATION, Tokyo (JP)

(72) Inventor: Koichi Akiyama, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/681,352

(22) Filed: Feb. 25, 2022

(65) Prior Publication Data

US 2022/0283486 A1    Sep. 8, 2022

(30) Foreign Application Priority Data

Feb. 26, 2021    (JP) .............................. JP2021-030928

(51) Int. Cl.
*G03B 21/20* (2006.01)
*G02B 27/28* (2006.01)
*G02B 27/10* (2006.01)
*G03B 21/00* (2006.01)

(52) U.S. Cl.
CPC ..... *G03B 21/2073* (2013.01); *G02B 27/1053* (2013.01); *G02B 27/283* (2013.01); *G03B 21/006* (2013.01); *G03B 21/208* (2013.01); *G03B 21/2013* (2013.01)

(58) Field of Classification Search
CPC .............. G03B 21/2073; G03B 21/283; G03B 21/2013; G03B 21/208; G02B 27/1053
USPC ........................................................ 353/20
See application file for complete search history.

(56) References Cited

U.S. PATENT DOCUMENTS

| | | |
|---|---|---|
| 5,161,042 A | 11/1992 | Hamada |
| 2011/0304829 A1 | 12/2011 | Enomoto et al. |
| 2013/0010002 A1 | 1/2013 | Takahashi et al. |
| 2019/0064400 A1 | 2/2019 | Tanaka |
| 2019/0394429 A1 | 12/2019 | Tanaka |
| 2020/0314397 A1 | 10/2020 | Akiyama |

FOREIGN PATENT DOCUMENTS

| | | |
|---|---|---|
| JP | H04-060538 A | 2/1992 |
| JP | 2000-131762 A | 5/2000 |
| JP | 2004-334082 A | 11/2004 |
| JP | 2012-003223 A | 1/2012 |
| JP | 2019-040177 A | 3/2019 |
| JP | 2020-003519 A | 1/2020 |
| JP | 2020-160236 A | 10/2020 |
| WO | 2012/014797 A1 | 2/2012 |

*Primary Examiner* — Jerry L Brooks
(74) *Attorney, Agent, or Firm* — Oliff PLC

(57) ABSTRACT

A light source device according to the present disclosure includes a light source unit configured to emit a first light beam, a second light beam, and a third light beam, a first polarization split element configured to transmit the first light beam and the second light beam and reflect the third light beam, a second polarization split element configured to transmit the first light beam and reflect the second light beam, a first retardation element, a first diffusion element configured to diffuse the third light beam, a second diffusion element configured to diffuse the second light beam, and a third diffusion element configured to diffuse the first light beam. The first retardation element converts a polarization direction of the second light beam from the first polarization split element, and converts a polarization direction of the another part of the second light beam from the second polarization split element.

13 Claims, 12 Drawing Sheets

LIGHT SOURCE DEVICE AND PROJECTOR

The present application is based on, and claims priority from JP Application Serial Number 2021-030928, filed Feb. 26, 2021, the disclosure of which is hereby incorporated by reference herein in its entirety.

BACKGROUND

1. Technical Field

The present disclosure relates to a light source device and a projector.

2. Related Art

There has been known a projector which modulates light emitted from a light source to generate image light based on image information, and then projects the image light thus generated. In JP-A-2020-160236 (Document 1), there is disclosed a projector provided with a light source device, and a light modulation device formed of a single liquid crystal panel. In this projector, a blue light beam, a red light beam, and two green light beams uniform in polarization direction are emitted from the light source device. The blue light beam, the red light beam, and the two green light beams respectively enter blue sub-pixels, red sub-pixels, and two sets of green sub-pixels of the liquid crystal panel in the state of being spatially separated by a microlens array disposed at an incident side of the liquid crystal panel.

When realizing a projector provided with a single liquid crystal panel having pixels each constituted by a plurality of sub-pixels for modulating the colored light beams different from each other, so-called a single-panel projector, it is possible to use the light source device in Document 1. However, when using the light source device in Document 1, there is a possibility that it is difficult to reduce the size of the projector.

SUMMARY

In view of the problems described above, a light source device according to an aspect of the present disclosure includes a light source unit configured to emit a first light beam having a first wavelength band, a second light beam having a second wavelength band different from the first wavelength band, and a third light beam having a third wavelength band different from the first wavelength band and the second wavelength band, a first polarization split element configured to transmit the first light beam and the second light beam having a first polarization direction out of the first light beam, the second light beam, and the third light beam entering the first polarization split element along a first direction from the light source unit toward the first direction, and reflect the third light beam having a second polarization direction different from the first polarization direction toward a second direction crossing the first direction, a second polarization split element disposed at the first direction side of the first polarization split element, and configured to transmit the first light beam out of the first light beam and the second light beam, which enter the second polarization split element along the first direction from the first polarization split element, toward the first direction, and reflect the second light beam toward the second direction, a first retardation element which is disposed between the first polarization split element and the second polarization split element, and is configured to provide a phase difference to light in the second wavelength band, a first diffusion element which is disposed at the second direction side of the first polarization split element, and configured to diffuse the third light beam which enters the first diffusion element along the second direction from the first polarization split element, and emit the third light beam diffused toward a third direction as an opposite direction to the second direction, a second diffusion element which is disposed at the second direction side of the second polarization split element, and configured to diffuse the second light beam which enters the second diffusion element along the second direction from the second polarization split element, and emit the second light beam diffused toward the third direction, and a third diffusion element disposed at the first direction side of the second polarization split element, and configured to diffuse the first light beam which enters the third diffusion element along the first direction from the second polarization split element, and emit the first light beam diffused toward a fourth direction as an opposite direction to the first direction. The second polarization split element reflects the first light beam, which enters the second polarization split element along the fourth direction from the third diffusion element, toward the third direction, transmits a part of the second light beam having the first polarization direction out of the second light beam, which enters the second polarization split element along the third direction from the second diffusion element, toward the third direction, and reflects another part of the second light beam having the first polarization direction toward the fourth direction. The first retardation element converts the second light beam which enters the first retardation element along the first direction from the first polarization split element and has the first polarization direction into the second light beam having the second polarization direction, and converts the another part of the second light beam which enters the first retardation element along the fourth direction from the second polarization split element and has the first polarization direction into the second light beam having the second polarization direction. The first polarization split element transmits the third light beam which enters the first polarization split element along the third direction from the first diffusion element, and reflects the second light beam which enters the first polarization split element along the fourth direction from the first retardation element and has the second polarization direction.

A projector according to an aspect of the present disclosure includes the light source device according to the aspect of the present disclosure, a light modulation device configured to modulate light from the light source device in accordance with image information, and a projection optical device configured to project the light modulated by the light modulation device.

DESCRIPTION OF EXEMPLARY EMBODIMENTS

First Embodiment

A first embodiment of the present disclosure will hereinafter be described using FIG. 1 through FIG. 9.

Figure 1:
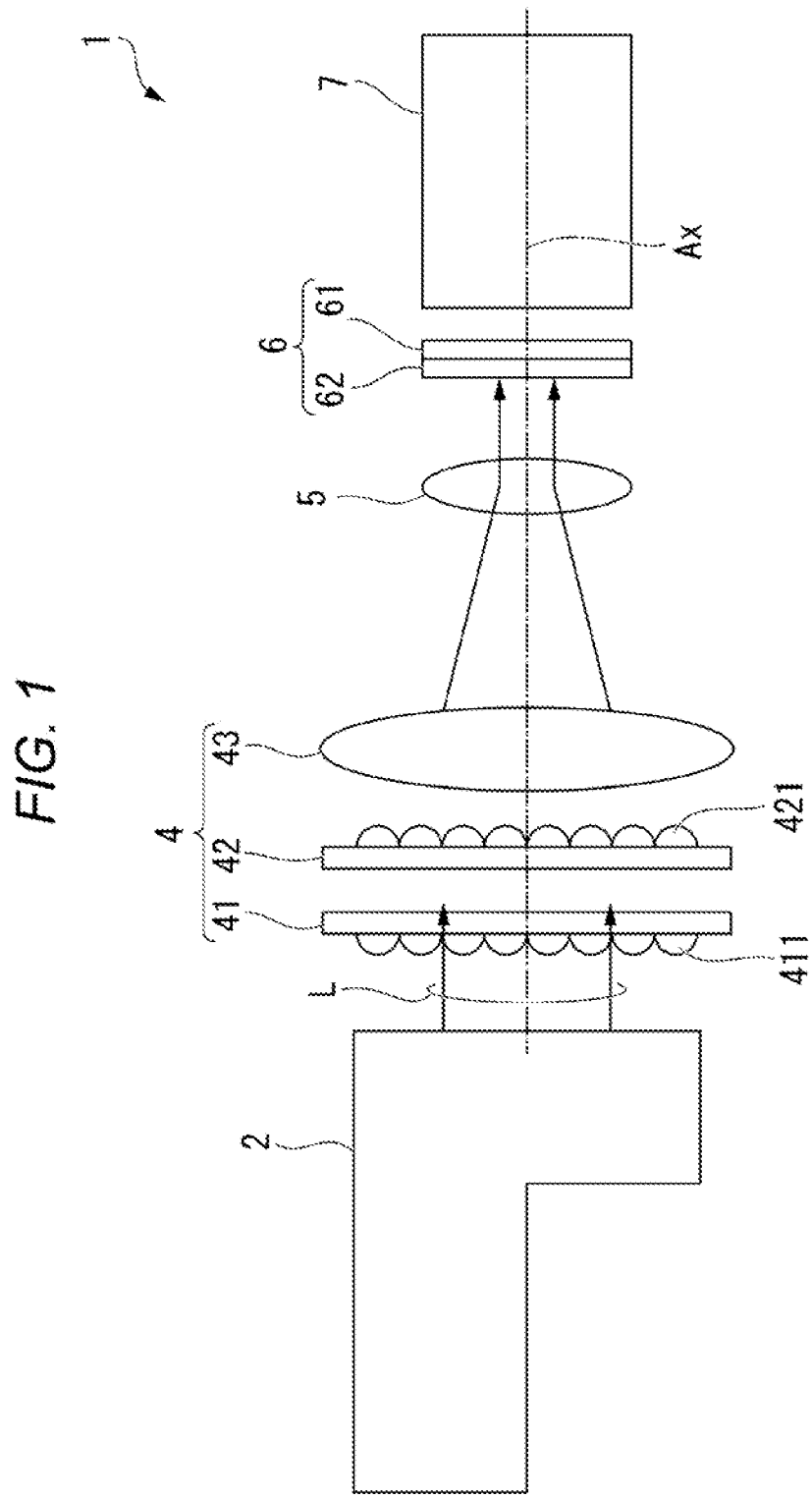
FIG. 1 is a schematic configuration diagram of a projector according to a first embodiment.

FIG. 1 is a schematic configuration diagram of a projector 1 according to the present embodiment.

It should be noted that in each of the drawings described below, the constituents are shown with the scale ratios of respective sizes set differently between the constituents in some cases in order to make each of the constituents eye-friendly.

The projector 1 according to the present embodiment modulates the light emitted from a light source device 2 to form an image corresponding to image information, and then projects the image thus formed on a projection target surface such as a screen in an enlarged manner. In other words, the projector 1 modulates the light emitted from the light source device 2 with a single light modulation device 6 including a single liquid crystal panel 61 to thereby font the image, and then projects the image thus formed. The projector 1 is a so-called single-panel projector.

As shown in FIG. 1, the projector 1 is provided with the light source device 2, a homogenization device 4, a field lens 5, the light modulation device 6, and a projection optical device 7. The light source device 2, the homogenization device 4, the field lens 5, the light modulation device 6, and the projection optical device 7 are disposed at predetermined positions along an illumination light axis Ax. The illumination light axis Ax is defined as an axis along a proceeding direction of a principal ray of the light L emitted from the light source 2.

The configuration of the light source device 2 and the homogenization device 4 will be described later in detail.

The field lens 5 is disposed between the homogenization device 4 and the light modulation device 6. The field lens 5 collimates the light L emitted from the homogenization device 4, and then guides the result to the light modulation device 6.

The projection optical device 7 projects the light modulated by the light modulation device 6, namely the light forming the image, on the projection target surface (not shown) such as a screen. The projection optical device 7 has a single projection lens or a plurality of projection lenses.

In the following description, the axis parallel to the proceeding direction of the light emitted from the light source device 2 along the illumination light axis Ax is defined as a Z axis, and the proceeding direction of the light is defined as a +Z direction. Further, two axes each perpendicular to the Z axis, and perpendicular to each other are defined as an X axis and a Y axis. Out of the directions along these axes, an upper side in the vertical direction in the space in which the projector 1 is installed is defined as a +Y direction. Further, the right side in the horizontal direction when viewing an object which the light enters along the +Z direction so that the +Y direction points the upper side in the vertical direction is defined as a +X direction. Although not shown in the drawings, an opposite direction to the +X direction is defined as a −X direction, an opposite direction to the +Y direction is defined as a −Y direction, and an opposite direction to the +Z direction is defined as a −Z direction.

The +X direction in the present embodiment corresponds to a first direction in the appended claims, and the −Z direction in the present embodiment corresponds to a second direction in the appended claims. Further, the +Z direction in the present embodiment corresponds to a third direction in the appended claims, and the −X direction in the present embodiment corresponds to a fourth direction in the appended claims.

Configuration of Light Source Device

Figure 2:
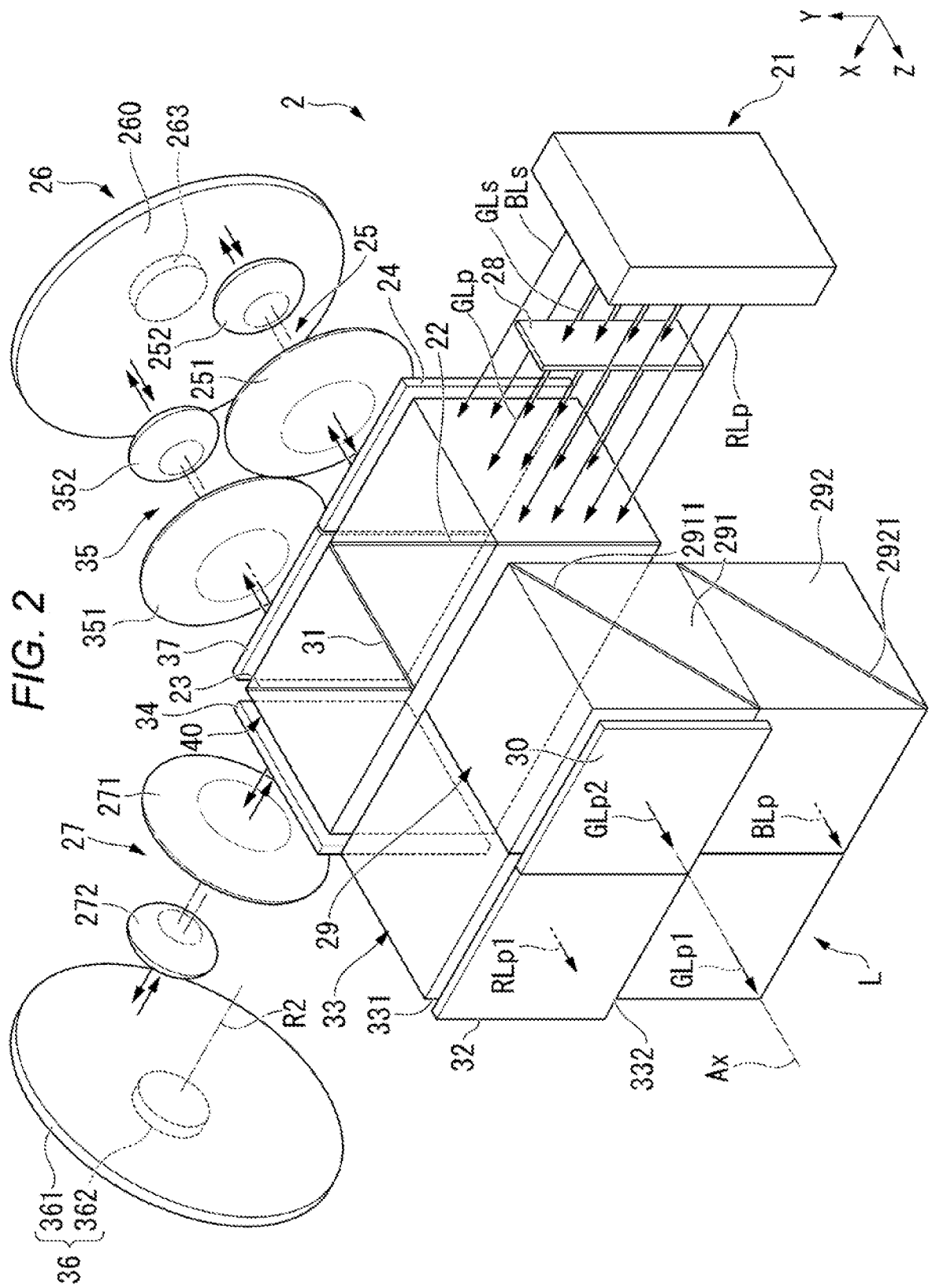
FIG. 2 is a perspective view of a light source device according to the first embodiment.
Figure 3:
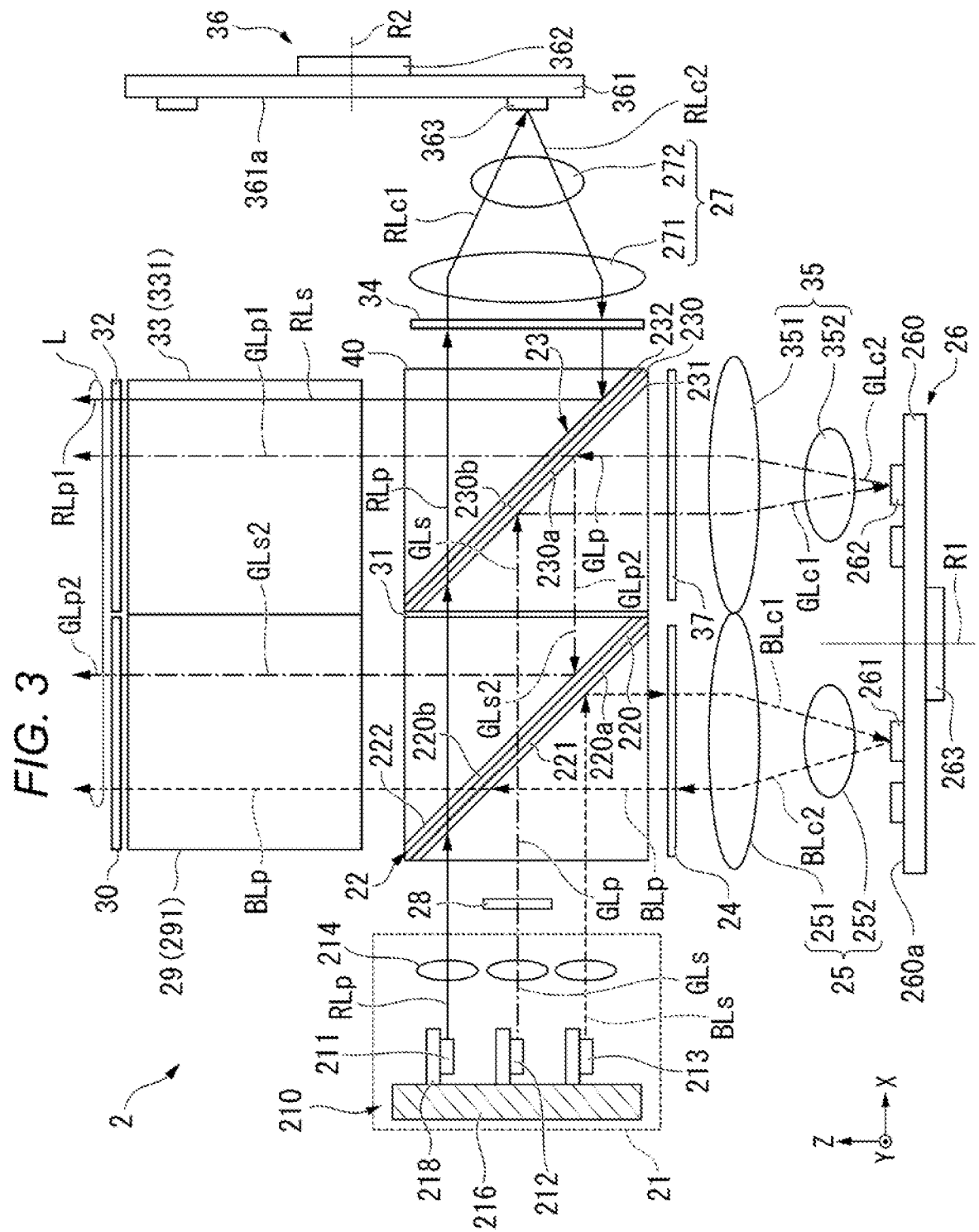
FIG. 3 is a plan view of the light source device viewed from a +Y direction.

FIG. 2 is a perspective view of the light source device 2 according to the present embodiment. FIG. 3 is a plan view of the light source device 2 viewed from the +Y direction.

As shown in FIG. 2 and FIG. 3, the light source device 2 emits the light L for illuminating the light modulation device 6 toward a direction parallel to the illumination light axis Ax, namely the +Z direction. The light L emitted by the light source device 2 includes a plurality of colored light beams which are linearly polarized light beams having a uniform polarization direction, and are spatially separated from each other. In the present embodiment, the light L emitted by the light source device 2 consists of four light beams each formed of P-polarized light. The four light beams correspond to a green light beam GLp1, a blue light beam BLp, a red light beam RLp1, and a green light beam GLp2.

The light source device 2 is provided with a light source unit 21, a fifth retardation element 28, a first optical member 22, a first retardation element 31, a second optical member 23, a second retardation element 24, a first light collection element 25, a third retardation element 37, a second light collection element 35, a first diffusion device 26, a fourth retardation element 34, a third light collection element 27, a second diffusion device 36, a first color separation element 29, a second color separation element 33, a sixth retardation element 30, and a seventh retardation element 32.

It should be noted that P-polarized light in the present embodiment corresponds to light having a first polarization direction in the appended claims, and S-polarized light corresponds to light having a second polarization direction in the appended claims. Further, as described later, the first optical member 22 and the second optical member 23 are different in orientation of a film for separating polarized light beams or colored light beams different from each other from the first color separation element 29 and the second color separation element 33. Therefore, the descriptions of P-polarized light and S-polarized light represent the polarization direction with respect to the first optical member 22 and the second optical member 23, and are reversed in the polarization direction with respect to the first color separation element 29 and the second color separation element 33. In other words, the P-polarized light with respect to the first optical member 22 and the second optical member 23 corresponds to the S-polarized light with respect to the first color separation element 29 and the second color separation element 33, and the S-polarized light with respect to the first optical member 22 and the second optical member 23 corresponds to the P-polarized light with respect to the first color separation element 29 and the second color separation element 33. It should be noted that in order to prevent confusion in the explanation, the P-polarized light and the S-polarized light are described as the polarization directions with respect to the first optical member 22 and the second optical member 23.

Configuration of Light Source Unit

Figure 4:
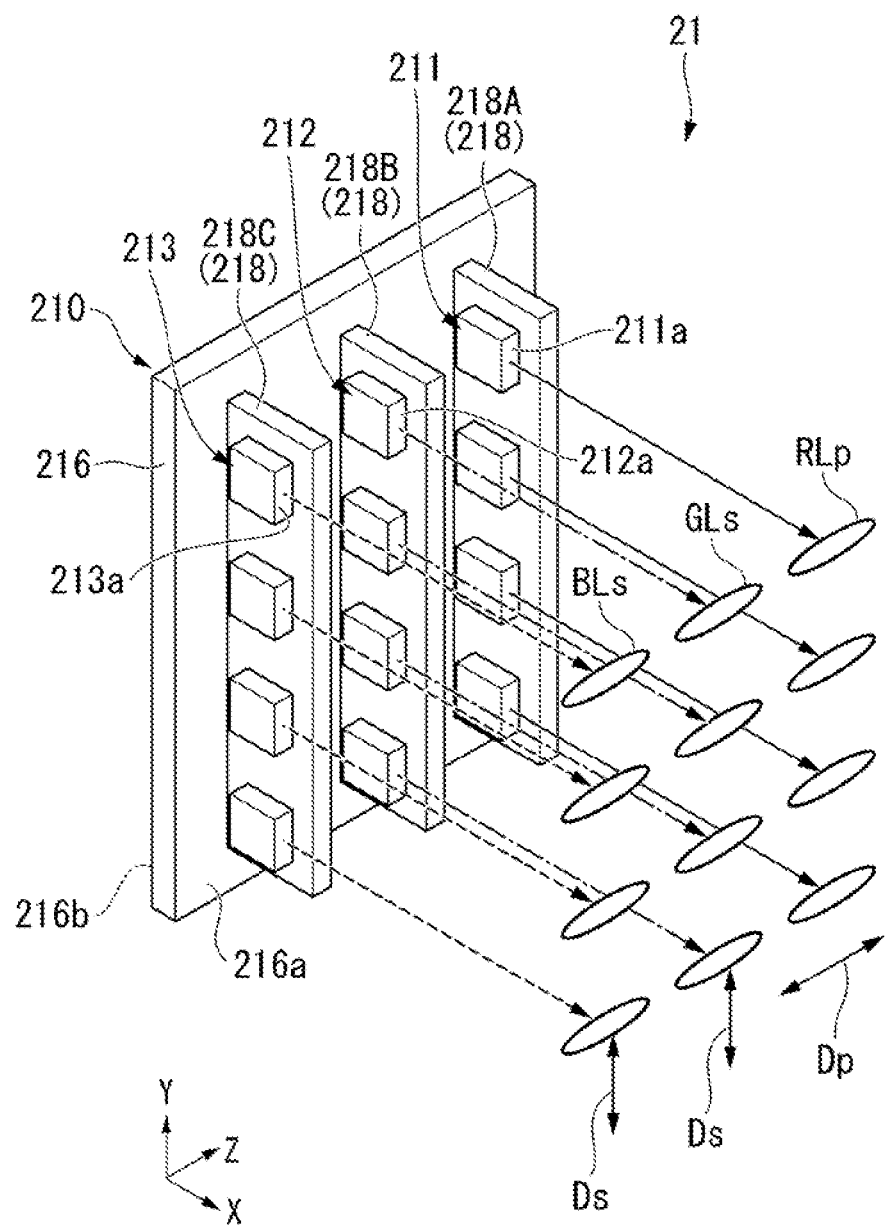
FIG. 4 is a perspective view of a light source unit.

FIG. 4 is a perspective view of the light source unit 21. It should be noted that in FIG. 4, an illustration of a collimator lens is omitted in order to make the drawing eye-friendly.

As shown in FIG. 2 and FIG. 4, the light source unit 21 has a support member 210, a plurality of first light emitting elements 211, a plurality of second light emitting elements 212, a plurality of third light emitting elements 213, and a plurality of collimator lenses 214. The support member 210 has a substrate 216, and a plurality of sub-mounts 218. The light source unit 21 emits red light beams RLp, green light beams GLs, and blue light beams BLs.

The substrate 216 has a first surface 216a, and a second surface 216b different from the first surface 216a. The substrate 216 is formed of metal high in thermal conductivity such as copper or aluminum. On the first surface 216a of the substrate 216, there is disposed the plurality of sub-mounts 218 at a distance from each other along the Z axis. In the case of the present embodiment, the plurality of sub-mounts 218 has a first sub-mount 218A, a second sub-mount 218B, and a third sub-mount 218C. The sub-mounts 218 are each formed of a ceramic material such as aluminum nitride cr alumina. The sub-mounts 218 intervene between the substrate 216 and the respective light emitting elements 211, 212, and 213 to thereby relax the thermal stress generated by a difference in linear expansion coefficient between the substrate 216 and the respective light emitting elements 211, 212, and 213. The sub-mounts 218 are each bonded to the substrate 216 with a bonding material such as a silver brazing material or gold-tin solder.

On one of the sub-mounts 218, the plurality of light emitting elements 211, 212, or 213 for emitting the light having the same color is disposed at a distance from each other along the Y axis. Specifically, the first sub-mount 218A is provided with the plurality of first light emitting elements 211 for emitting the red light beams RLp disposed at a distance from each other along the Y axis. The second sub-mount 218B is provided with the plurality of second light emitting elements 212 for emitting the green light beams GLs disposed at a distance from each other along the Y axis. The third sub-mount 218C is provided with the plurality of third light emitting elements 213 for emitting the blue light beans BLs disposed at a distance from each other along the Y axis.

It should be noted that the number of the light emitting elements 211, 212, or 213 provided to one of the sub-mounts 218 is not limited to four, but can arbitrarily be changed. Specifically, the light source unit 21 in the present embodiment has a multi-chip package structure in which the plurality of light emitting elements 211, 212, and 213 for respectively emitting the red light beams RLp, the green light beams GLs, and the blue light beams BLs is mounted on the single support member 210.

The first light emitting elements 211 are each formed of a semiconductor laser for emitting the red light beam RLp. The red light beam RLp is a laser beam having a red wavelength band of, for example, 610 through 750 nm. The second light emitting elements 212 are each formed of a semiconductor laser for emitting the green light beam GLs. The green light beam GLs is a laser beam having a green wavelength band of, for example, 500 through 560 nm. The third light emitting elements 213 are each formed of a semiconductor laser for emitting the blue light beam BLs. The blue light beam BLs is a laser beam having a blue wavelength band of, for example, 440 through 490 nm. It should be noted that it is also possible for each of the light emitting elements 211, 212, and 213 to be formed of another solid-state light source such as an LED (Light Emitting Diode) instead of the semiconductor laser.

The red light beam in the present embodiment corresponds to a first light beam having a first wavelength band in the appended claims. The green light beam in the present embodiment corresponds to a second light beam having a second wavelength band in the appended claims. The blue light beam in the present embodiment corresponds to a third light beam having a third wavelength band in the appended claims.

It is common in current high-power semiconductor lasers for projectors that, for example, an AlInGa series semiconductor laser is used as a blue semiconductor layer, and an AlGaInP series semiconductor laser is used as a red semiconductor laser. The polarization direction of the blue light beam emitted from the blue semiconductor laser and the polarization direction of the red light beam emitted from the red semiconductor laser are different from each other due to the fact that the blue semiconductor laser and the red semiconductor laser are different in constituent material, and thus, crystal structure from each other in such a manner. In contrast, the polarization direction of the blue light beam emitted from the blue semiconductor laser and the polarization direction of the green light beam emitted from the green semiconductor laser coincide with each other although the constituent material of the blue semiconductor laser and the constituent material of the green semiconductor laser are different from each other.

As shown in FIG. 4, the light emitting elements 211, 212, and 213 respectively have light exit surfaces 211a, 212a, and 213a each having a rectangular shape having short sides and long sides when viewed from a direction along a principal ray of the light beam emitted from corresponding one of the light emitting elements. The light beams emitted from the respective light emitting elements 211, 212, and 213 are larger in diffusion angle in the short-side direction of the light exit surfaces 211a, 212a, and 213a than in the longitudinal direction of the light exit surfaces 211a, 212a, and 213a. As a result, a cross-sectional surface perpendicular to the principal ray of the light beam becomes to have an elliptical shape having a long axis along the short-side direction of corresponding one of the light exit surfaces 211a, 212a, and 213a, and a short axis along the longitudinal direction of corresponding one of the light exit surfaces 211a, 212a, and 213a.

Out of the three colored light beams different in color from each other, the polarization direction Ds of the blue light beams BLs coincides with the longitudinal direction of the light exit surface 213a, namely the short axis direction of the ellipse as the cross-sectional shape. Similarly, the polarization direction Ds of the green light beams GLs coincides with the longitudinal direction of the light exit surface 212a, namely the short axis direction of the ellipse as the cross-sectional shape. In contrast, due to the difference in constituent material described above, the polarization direction Dp of the red light beams RLp coincides with the short-side direction of the light exit surface 211a, namely the long axis direction of the ellipse as the cross-sectional shape.

In the case of the present embodiment, each of the first light emitting elements 211, the second light emitting elements 212, and the third light emitting elements 213 is disposed so that the short-side direction of corresponding one of the light exit surfaces 211a, 212a, and 213a is parallel to the Z-axis direction, and the longitudinal direction of corresponding one of the light exit surfaces 211a, 212a, and 213a is parallel to the Y-axis direction. Therefore, the polarization direction Ds of the blue light beams BLs and the green light beams GLs and the polarization direction Dp of the red light beams RLp are perpendicular to each other on the Y-Z plane.

As shown in FIG. 3, the collimator lenses 214 are disposed on light paths of the light beams emitted from the light emitting elements 211, 212, and 213, respectively. The collimator lenses 214 are disposed so as to correspond one-to-one to the light emitting elements 211, 212, and 213. The collimator lens 214 collimates the light beam emitted from corresponding one of the light emitting elements 211, 212, and 213 to that collimator lens 214.

It should be noted that it is possible for the light source unit 21 to have a frame surrounding the plurality of light emitting elements 211, 212, and 213, or to have a cover glass for covering an opening of the frame in addition of the configuration described above. When the light source unit 21 has the cover glass, the collimator lenses 214 can be disposed integrally with the cover glass.

Configuration of Fifth Retardation Element

As shown in FIG. 2 and FIG. 3, the fifth retardation element 28 is disposed on the light paths of the four green light beams GLp respectively emitted from the four second light emitting elements 212 arranged along the Y axis. The fifth retardation element 28 is formed of a ½ wave plate with respect to the light in the green wavelength band. Each of the green light beams GLs emitted from the second light emitting elements 212 is transmitted through the fifth retardation element 28 to thereby be rotated in polarization direction as much as 90° in the Y-Z plane to be converted into a green light beam GLp as P-polarized light. Thus, the polarization direction of the green light beam GLp and the polarization direction of the red light beam RLp coincide with each other. The polarization direction of the green light beam GLp and the polarization direction of the blue light beam BLs are perpendicular to each other on the Y-Z plane. Specifically, the polarization direction of the green light beam GLp and the polarization direction of the red light beam RLp become the polarization direction of P-polarized light with respect to the first optical member 22. The polarization direction of the blue light beam BLs becomes the polarization direction of S-polarized light with respect to the first optical member 22.

Configuration of First Optical Member

The red light beams RLp as P-polarized light, the green light beams GLp as P-polarized light, and the blue light beams BLs as S-polarized light emitted from the light source unit 21 enter the first optical member 22 along the +X direction. The first optical member 22 is formed of a plate type polarization split element.

The first optical member 22 in the present embodiment corresponds to a first polarization split element in the appended claims.

The first optical member 22 has a first transparent substrate 220, a first optical layer 221, and a second optical layer 222. The first transparent substrate 220 has a first surface 220a and a second surface 220b facing to respective directions opposite to each other. The first transparent substrate 220 is formed of a general optical glass plate.

The first transparent substrate 220 is disposed so as to be tilted 45° with respect to the X axis and the Z axis. In other words, the first transparent substrate 220 is tilted 45° with respect to the X-Y plane and the Y-Z plane. The first transparent substrate 220 is disposed so that the first surface 220a is directed toward the light source unit 21. The first optical layer 221 is formed on the first surface 220a of the first transparent substrate 220.

Therefore, the first optical layer 221 is disposed so as to be opposed to the light source unit 21, and at the same time, tilted 45° with respect to the X-Y plane and the Y-Z plane. The second optical layer 222 is formed on the second surface 220b of the first transparent substrate 220. In other words, the second optical layer 222 is disposed at the +X direction side of the first optical layer 221, and is tilted 45° with respect to the X-Y plane and the Y-Z plane.

The first optical layer 221 has a polarization split characteristic of transmitting the P-polarized light and reflecting the S-polarized light with respect to the light in the blue wavelength band out of the light which enters the first optical layer 221. Therefore, the blue light beams BLs as S-polarized light which enter the first optical layer 221 along the +X direction are reflected by the first optical layer 221 toward the −Z direction. Further, the blue light beams BLp as P-polarized light which are reflected by a first diffusion element 261 described later, and then enter the first optical layer 221 along the +Z direction are transmitted by the first optical layer 221 toward the +Z direction.

Further, the first optical layer 221 has a characteristic of transmitting the light in the red wavelength band and the light in the green wavelength band. Therefore, the red light beams RLp as P-polarized light and the green light beams GLp as P-polarized light which enter the first optical layer 221 along the +X direction are transmitted by the first optical layer 221 along the +X direction. The first optical layer 221 is formed of, for example, a dielectric multilayer film.

The second optical layer 222 has a polarization split characteristic of transmitting the P-polarized light and reflecting the S-polarized light with respect to the light in the green wavelength band out of the light which enters the second optical layer 222. Therefore, the green light beams GLp as P-polarized light which enter the second optical layer 222 along the +X direction are transmitted by the second optical layer 222 toward the +X direction. Further, a green light beam GLs2 as S-polarized light which is transmitted through the first retardation element 31 described later, and then enters the second optical layer 222 along the −X direction is reflected by the second optical layer 222 toward the +Z direction.

Further, the second optical layer 222 has a characteristic of transmitting the light in the red wavelength band and the light in the blue wavelength band. Therefore, the second optical layer 222 transmits the red light beams RLp as P-polarized light which enter the second optical layer 222 along the +X direction, and the blue light beams BLp as P-polarized light which are reflected by the first diffusion element 261 described later and then enter the second optical layer 222 along the +Z direction are transmitted by the second optical layer 222 toward the +Z direction. The second optical layer 222 is formed of, for example, a dielectric multilayer film.

Therefore, the red light beams RLp as P-polarized light which enter the first optical member 22 having the configuration described above along the +X direction from the light source unit 21 are transmitted by the first optical member 22 toward the +X direction, the green light beams GLp as P-polarized light are transmitted by the first optical member 22 toward the +X direction, and the blue light beams BLs as S-polarized light are reflected by the first optical member 22 toward the −Z direction.

Since the first optical member 22 in the present embodiment is a plate type polarization split element, it is possible to design a function of the first optical layer 221 to be formed on the first surface 220a of the first transparent substrate 220 and a function of the second optical layer 222 to be formed on the second surface 220b of the first transparent substrate 220 independently of each other. Thus, it is possible to perform the film design of the first optical layer 221 and the second optical layer 222 with relative ease.

Configuration of First Retardation Element

The first retardation element 31 is disposed between the first optical member 22 and the second optical member 23. The green light beams GLp and the red light beams RLp having been transmitted through the first optical member 22 enter the first retardation element 31. The first retardation element 31 provides a phase difference of a half of the green wavelength band to the green light, but does not provide a phase difference to the light having the wavelength band other than the green wavelength band such as the red light. As described above, the first retardation element 31 is formed of a wavelength-selective retardation element. Specifically, as the wavelength-selective retardation element, it is possible to use ColorSelect® (trade name; product of ColorLink Inc.).

Configuration of Second Optical Member

The second optical member 23 is disposed at the +X direction side of the first optical member 22. In other words, the second optical member 23 is disposed at the +X direction side of the second layer 222 of the first optical member 22. The green light beams GLs and the red light beams RLp as S-polarized light having been transmitted through the first retardation element 31 via the first optical member 22 enter the second optical member 23. Similarly to the first optical member 22, the second optical member 23 is formed of a plate type polarization split element.

The second optical member 23 in the present embodiment corresponds to a second polarization split element in the appended claims.

The second optical member 23 has a second transparent substrate 230, a third optical layer 231, and a fourth optical layer 232. The second transparent substrate 230 has a third surface 230a and a fourth surface 230b facing to respective directions opposite to each other. The second transparent substrate 230 is formed of a general optical glass plate.

The second transparent substrate 230 is disposed so as to be tilted 45° with respect to the X axis and the Z axis. In other words, the second transparent substrate 230 is tilted 45° with respect to the X-Y plane and the Y-Z plane. The second transparent substrate 230 is disposed so that the third surface 230a is directed toward the first optical member 22. In other words, the third surface 230a of the second transparent substrate 230 and the second surface 220b of the first transparent substrate 220 are opposed to each other. The third optical layer 231 is formed on the third surface 230a of the second transparent substrate 230. Therefore, the third optical layer 231 is disposed so as to be opposed to the first optical member 22, and at the same time, tilted 45° with respect to the X-Y plane and the Y-Z plane. The fourth optical layer 232 is formed on the fourth surface 230b of the second transparent substrate 230. In other words, the fourth optical layer 232 is disposed at the +X direction side of the third optical layer 231, and is tilted 45° with respect to the X-Y plane and the Y-Z plane.

The third optical layer 231 has a characteristic of transmitting a part of the P-polarized light and reflecting another part of the P-polarized light with respect to the light in the green wavelength band out of the light which enters the third optical layer 231.

Specifically, the third optical layer 231 transmits 50% of the green light beams GLp as P-polarized light, and reflects 50% of the green light beams GLp as P-polarized light. Therefore, the green light beams GLs as S-polarized light which enter the third optical layer 231 along the +X direction from the first retardation element 31 are reflected by the third optical layer 231 toward the −Z direction.

Further, the third optical layer 231 has an optical characteristic of transmitting the P-polarized light out of the light in the red wavelength band. Therefore, the red light beams RLp as P-polarized light which enter the third optical layer 231 along the +X direction from the first optical layer 22 are transmitted by the third optical layer 231 toward the +X direction. It should be noted that the optical characteristic with respect to the light in the blue wavelength band does not matter for the third optical layer 231. The third optical layer 231 is formed of, for example, a dielectric multilayer film. The third optical layer 231 is required to reflect the P-polarized light which is generally difficult to reflect with respect to the light in the green wavelength band, but there is no need to reflect the whole of the P-polarized light, and therefore, it is easy to design the dielectric multilayer film.

The fourth optical layer 232 has an optical characteristic of transmitting the P-polarized light out of the light in the green wavelength band. Further, the fourth optical layer 232 has a polarization split characteristic of transmitting the P-polarized light and reflecting the S-polarized light with respect to the light in the red wavelength band. The fourth optical layer 232 is formed of, for example, a dielectric multilayer film.

It should be noted that when using a film having an optical characteristic of reflecting the red light as S-polarized light as the third optical layer 231, it is possible to form the fourth optical layer 232 with a mere AR coat film.

According to the configuration described above, it is possible for the second optical member 23 to reflect the green light beams GLs, which are the S-polarized light, and enter the second optical member 23 along the +X direction from the first retardation element 31, toward the −Z direction, and to transmit the red light beams RLp, which are the P-polarized light, and enter the second optical member 23 along the +X direction from the first retardation element 31, toward the +X direction. Further, it is possible for the second optical member 23 to transmit 50% of the green light beams GLp toward the +Z direction, reflect 50% of the green light beams GLp, and reflect the red light beams RLs as S-polarized light emitted from the third diffusion element 363 described later toward the +Z direction out of the green light beams GLp of the P-polarized light emitted from the second diffusion element 262 described later.

Since the second optical member 23 in the present embodiment is the plate type polarization split element, it is possible to design a function of the third optical layer 231 to be formed on the third surface 230a of the second transparent substrate 230 and a function of the fourth optical layer 232 to be formed on the fourth surface 230b of the second transparent substrate 230 independently of each other. Therefore, it is possible to perform the film design of the third optical layer 231 and the fourth optical layer 232 with relative ease.

Configuration of Second Retardation Element

The second retardation element 24 is disposed at the −Z direction side of the first optical member 22. In other words, the second retardation element 24 is disposed between the first optical member 22 and the first diffusion device 26 on the Z axis. The blue light beams BLs as S-polarized light which have been reflected by the first optical layer 221 of the first optical member 22 toward the −Z direction enter the second retardation element 24. The second retardation element 24 is formed of a ¼ wave plate with respect to the blue wavelength band of the blue light beams BLs. Therefore, the blue light beams BLs as S-polarized light having been reflected by the first optical member 22 are converted by the second retardation element 24 into, for example, blue light beams BLc1 as clockwise circularly polarized light, and is then emitted toward the first light collection element 25. In other words, the second retardation element 24 converts the polarization state of the blue light beams BLs which enter the second retardation element 24.

Configuration of First Light Collection Element

The first light collection element 25 is disposed at the −Z direction side of the second retardation element 24. In other words, the first light collection element 25 is disposed between the second retardation element 24 and the first diffusion device 26 on the Z axis. The blue light beams BLc1 which enter the first light collection element 25 from the second retardation element 24 are converged by the first light collection element 25 on the first diffusion element 261 of the first diffusion device 26. Further, the first light collection element 25 collimates a blue light beam BLc2 described later which enters the first light collection element 25 from the first diffusion element 261. In the example shown in FIG. 3, the first light collection element 25 is constituted by a first lens 251 and a second lens 252. It should be noted that the number of the lenses constituting the first light collection element 25 is not limited.

Configuration of Third Retardation Element

The third retardation element 37 is disposed at the −Z direction side of the second optical member 23. In other words, the third retardation element 37 is disposed between the second optical member 23 and the first diffusion device 26 on the Z axis. The green light beams GLs as S-polarized light which have been reflected by the third optical layer 231 of the second optical member 23 toward the −Z direction enter the third retardation element 37. The third retardation element 37 is formed of a ¼ wave plate with respect to the green wavelength band of the green light beams GLs. Therefore, the green light beams GLs as S-polarized light having been reflected by the second optical member 23 are converted by the third retardation element 37 into, for example, green light beams GLc1 as clockwise circularly polarized light, and is then emitted toward the second light collection element 35. In other words, the third retardation element 37 converts the polarization state of the green light beams GLs which enter the third retardation element 37.

Configuration of Second Light Collection Element

The second light collection element 35 is disposed at the −Z direction side of the second optical member 23. In other words, the second light collection element 35 is disposed between the second optical member 23 and the first diffusion device 26 on the Z axis. The green light beams GLc1 which are emitted from the third retardation element 37 are converged by the second light collection element 35 on the second diffusion element 262 of the first diffusion device 26. Further, the second light collection element 35 collimates a green light beam GLc2 described later and emitted from the second diffusion element 262, and then emits the result toward the second optical member 23. In the example shown in FIG. 3, the second light collection element 35 is constituted by a first lens 351 and a second lens 352. It should be noted that the number of the lenses constituting the second light collection element 35 is not limited.

Configuration of First Diffusion Device

The first diffusion device 26 has a first substrate 260, the first diffusion element 261, a second diffusion element 262, and a first rotary device 263. The first diffusion device 26 is disposed at the −Z direction side of the first light collection element 25 and the second light collection element 35. In other words, the first diffusion device 26 is disposed at the −Z direction side of the first optical member 22 and the second optical member 23.

The first substrate 260 has a first surface 260a opposed to the first light collection element 25 and the second light collection element 35. The first diffusion element 261 and the second diffusion element 262 are disposed on the first surface 260a of the first substrate 260. The first diffusion device 26 diffusely reflects the blue light beams BLc1, which enter the first diffusion device 26 from the first light collection element 25 along the −Z direction, toward the +Z direction with the first diffusion element 261. Further, the first diffusion device 26 diffusely reflects the green light beams GLc1, which enter the first diffusion device 26 from the second light collection element 35 along the −Z direction, toward the +Z direction with the second diffusion element 262.

The first rotary device 263 is formed of a motor and so on. The first rotary device 263 rotates the first substrate 260 provided with the first diffusion element 261 and the second diffusion element 262 centering on a first rotational axis R1 perpendicular to the first surface 260a.

Figure 5:
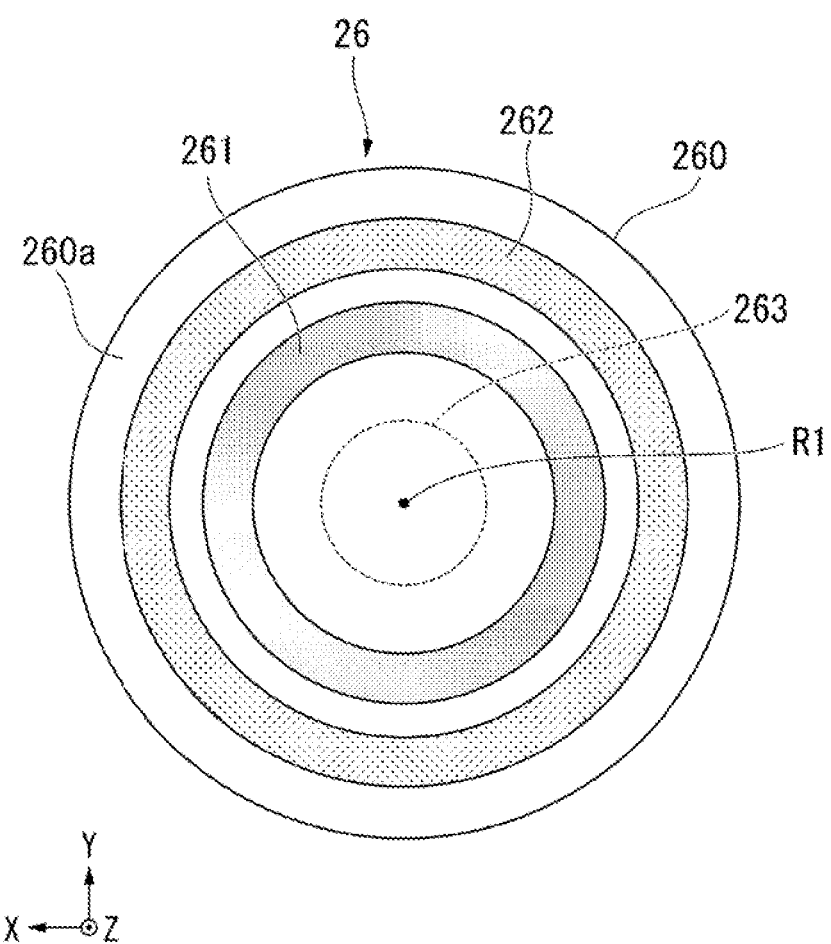
FIG. 5 is a front view of a first diffusion device viewed from a +Z direction.

FIG. 5 is a front view of the first diffusion device 26 viewed from the +Z direction.

As shown in FIG. 5, the first diffusion element 261 is disposed so as to form a ring-like shape centering on the first rotational axis R1 on the first surface 260a of the first substrate 260. The second diffusion element 262 is disposed so as to form a ring-like shape centering on the first rotational axis R1 on the first surface 260a of the first substrate 260.

As described above, the first diffusion element 261 and the second diffusion element 262 are concentrically disposed. A distance from the first rotational axis R1 to the first diffusion element 261 and a distance from the first rotational axis R1 to the second diffusion element 262 are different from each other. In the case of the present embodiment, the distance from the first rotational axis R1 to the first diffusion element 261 is shorter than the distance from the first rotational axis R1 to the second diffusion element 262. In other words, the first diffusion element 261 is disposed at an inner peripheral side of the second diffusion element 262 in the first substrate 260.

The first diffusion element 261 reflects the blue light beams BLc1 having entered the first diffusion element 261 with a wide angle. The second diffusion element 262 reflects the green light beams GLc1 having entered the second diffusion element 262 with a wide angle. The diffusion characteristic of the first diffusion element 261 and the diffusion characteristic of the second diffusion element 262 can be the same as each other, or can also be different from each other. When making the diffusion characteristic of the first diffusion element 261 and the diffusion characteristic of the second diffusion element 261 different from each other, it is desirable for these diffusion characteristics to be optimized in accordance with the wavelength band of the incident light.

The blue light beams BLc1 having entered the first diffusion element 261 are reflected by the first diffusion element 261 to thereby be converted into the blue light beam BLc2 as circularly polarized light having an opposite rotational direction. Specifically, the blue light beams BLc1 as the clockwise circularly polarized light are converted by the first diffusion element 261 into the blue light beam BLc2 as counterclockwise circularly polarized light. The blue light beam BLc2 emitted from the first diffusion device 26 passes the first light collection element 25 toward the +Z direction, and then enters the second retardation element 24 once again. On this occasion, the blue light beam BLc2 which enters the second retardation element 24 from the first light collection element 25 is converted by the second retardation element 24 into the blue light beam BLp as P-polarized light.

The blue light beam BLp enters the first optical member 22. On this occasion, the blue light beam BLp which is emitted from the first diffusion element 261 along the +Z direction, and then enters the first optical layer 221 is transmitted by the first optical layer 221 toward the +Z direction. Further, the blue light beam BLp which is emitted from the first optical layer 221 along the +Z direction, and is transmitted through the first transparent substrate 220, and then enters the second optical layer 222 is transmitted by the second optical layer 222 toward the +Z direction. In such a manner, the blue light beam BLp is emitted from the first optical member 22 toward the +Z direction.

The green light beams GLc1 having entered the second diffusion element 262 are reflected by the second diffusion element 262 to thereby be converted into the green light beam GLc2 as circularly polarized light having an opposite rotational direction. Specifically, the green light beams GLc1 as the clockwise circularly polarized light are converted by the second diffusion element 262 into the green light beam GLc2 as counterclockwise circularly polarized light. The green light beam GLc2 emitted from the first diffusion device 26 passes the second light collection element 35 toward the +Z direction, and then enters the third retardation element 37 once again. On this occasion, the green light beam GLc2 which enters the third retardation element 37 from the second light collection element 35 is converted by the third retardation element 37 into the green light beam GLp as P-polarized light.

The green light beam GLp enters the second optical member 23. On this occasion, the third optical layer 231 transmits a green light beam GLp1 corresponding to 50% of the green light beam GLp, which enters the third optical layer 231 along the +Z direction from the second diffusion element, toward the +Z direction, and reflects a green light beam GLp2 corresponding to 50% of the green light beam GLp toward the −X direction. Further, the green light beam GLp1 as 50% thereof which is emitted from the third optical layer 231 along the +Z direction, and is transmitted through the second transparent substrate 230, and then enters the fourth optical layer 232 is transmitted by the fourth optical layer 232 toward the +Z direction. In such a manner, the green light beam GLp1 is emitted from the second optical member 23 toward the +Z direction, and the green light beam GLp2 is emitted from the second optical member 23 toward the −X direction.

The green light beam GLp2 as P-polarized light having been emitted from the second optical member 23 toward the −X direction is converted by the first retardation element 31 into the green light beam GLs2 as S-polarized light. The green light beam GLs2 enters the first optical member 22. On this occasion, the green light beam GLs2 which enters the second optical layer 222 along the −X direction from the first retardation element 31 is reflected by the second optical layer 222 toward the +Z direction. In such a manner, the green light beam GLs2 is emitted from the first optical member 22 toward the +Z direction.

Configuration of Fourth Retardation Element

The fourth retardation element 34 is disposed at the +X direction side of the second optical member 23. In other words, the fourth retardation element 34 is disposed between the second optical member 23 and the second diffusion device 36 on the X axis. The red light beams RLp as P-polarized light enter the fourth retardation element 34 from the second optical member 23 along the +X direction. The fourth retardation element 34 is formed of a ¼ wave plate with respect to the red wavelength band. The red light beams RLp as P-polarized light having been transmitted through the second optical member 23 are converted by the fourth retardation element 34 into, for example, red light beams RLc1 as clockwise circularly polarized light, and are then emitted toward the third light collection element 27. In other words, the fourth retardation element 34 converts the polarization state of the red light beams RLp which enter the fourth retardation element 34.

Configuration of Third Light Collection Element

The third light collection element 27 is disposed at the +X direction side of the fourth retardation element 34. In other words, the third light collection element 27 is disposed between the fourth retardation element 34 and the second diffusion device 36 on the X axis. The red light beams RLc1 which enter the third light collection element 27 from the fourth retardation element 34 are converged by the third light collection element 27 on the third diffusion element 363 of the second diffusion device 36. Further, the third light collection element 27 collimates a red light beam RLc2 described later which enters the third light collection element 27 from the second diffusion device 36. In the example shown in FIG. 3, the third light collection element 27 is constituted by a first lens 271 and a second lens 272. It should be noted that the number of the lenses constituting the third light collection element 27 is not limited.

Configuration of Second Diffusion Device

The second diffusion device 36 has a second substrate 361, a third diffusion element 363, and a second rotary device 362. The second diffusion device 36 is disposed at the +X direction side of the third light collection element 27. In other words, the second diffusion device 36 is disposed at the +X direction side of the second optical member 23.

The second substrate 361 has a second surface 361a opposed to the third light collection element 27. The third diffusion element 363 is disposed on the second surface 361a of the second substrate 361. The second diffusion device 36 diffusely reflects the red light beams RLc1, which enter the second diffusion device 36 from the third light collection element 27 along the +X direction, toward the −X direction with the third diffusion element 363.

The second rotary device 362 is formed of a motor and so on. The second rotary device 362 rotates the second substrate 361 provided with the third diffusion element 363 centering on a second rotational axis R2 perpendicular to the second surface 361a.

The red light beams RLc1 having entered the second diffusion device 36 are reflected by the third diffusion element 363 to thereby be converted into the red light beam RLc2 as circularly polarized light having an opposite rotational direction. Specifically, the red light beams RLc1 as the counterclockwise circularly polarized light are converted by the third diffusion element 363 into the red light beams RLc2 as clockwise circularly polarized light. The red light beam RLc2 emitted from the second diffusion device 36 passes the third light collection element 21 toward the −X direction, and then enters the fourth retardation element 34 once again. On this occasion, the red light beam RLc2 which enters the fourth retardation element 34 from the third light collection element 27 is converted by the fourth retardation element 34 into the red light beam RLs as S-polarized light. The red light beam RLs thus converted enters the second optical member 23. On this occasion, the red light beam RLs which enters the fourth optical layer 232 along the −X direction from the second diffusion device 36 is reflected by the fourth optical layer 232 toward the +Z direction. In such a manner, the red light beam RLs is emitted from the second optical member 23 toward the +Z direction.

Configuration of First Color Separation Element

Figure 6:
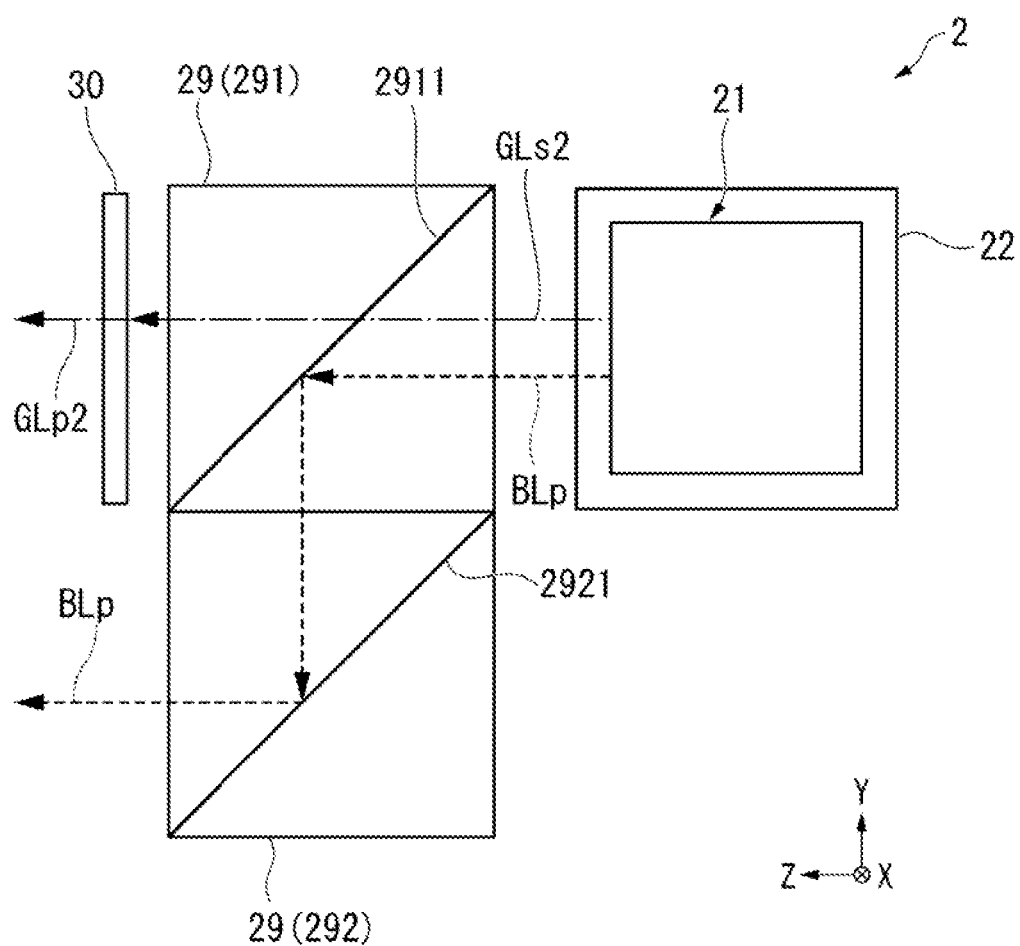
FIG. 6 is a side view of the light source device viewed from a −X direction.

FIG. 6 is a side view of the light source device 2 viewed from the −X direction. In other words, FIG. 6 shows the state of the first color separation element 29, the sixth retardation element 30, and so on viewed from the −X direction. In FIG. 6, in order to make the drawing eye-friendly, an illustration of the second retardation element 24, the first light collection element 25, the first diffusion device 26, and so on is omitted.

As shown in FIG. 6, the first color separation element 29 is disposed at the +Z direction side of the first optical member 22. The first color separation element 29 has a dichroic prism 291 and a reflecting prism 292. The dichroic prism 291 and the reflecting prism 292 are arranged side by side along the Y axis. The first color separation element 29 separates the light emitted toward the +Z direction from the first optical member 22 into the blue light beam BLp and the green light beam GLs2.

The light including the blue light beam BLp and the green light beam GLs2 emitted from the first optical member 22 enters the dichroic prism 291. The dichroic prism 291 is formed of a prism type color separation element formed by combining two base members each having a substantially isosceles right triangular prismatic shape with each other to form a substantially rectangular solid shape. On the interface between the two base members, there is disposed a color separation layer 2911. The color separation layer 2911 is tilted 45° with respect to the Y axis and the Z axis. In other words, the color separation layer 2911 is tilted 45° with respect to the X-Y plane and the X-Z plane.

The color separation layer 2911 functions as a dichroic mirror which reflects blue light and transmits colored light having a Longer wavelength band than the blue wavelength band, namely green light, out of the incident light. Therefore, the green light beam GLs2 out of the light having entered the dichroic prism 291 from the first optical member 22 is transmitted through the color separation layer 2911 toward the +Z direction to be emitted outside the dichroic prism 291.

In contrast, the blue light beam BLp out of the light having entered the dichroic prism 291 from the first optical member 22 is reflected toward the −Y direction by the color separation layer 2911. In the case of the present embodiment, the blue light beam BLp is the S-polarized light with respect to the color separation layer 2911 of the dichroic prism 291, and the green light beam GLs2 is the P-polarized light with respect to the color separation layer 2911 of the dichroic prism 291. In other words, the color separation layer 2911 for performing transmission and reflection in accordance with the wavelength band in the present embodiment reflects the blue light beam BLp which enters the color separation layer 2911 as S-polarized light, and transmits the green light beam GLs2 which enters the color separation layer 2911 as P-polarized light. In a general optical film, the S-polarized light is easy to reflect, and the P-polarized light is easy to transmit. Since it is sufficient for the color separation layer 2911 in the present embodiment to be designed so as to transmit the P-polarized light and reflect the S-polarized light as described above, the film design of the color separation layer 2911 is easy.

It should be noted that it is possible to adopt a dichroic mirror having the color separation layer 2911 instead of the dichroic prism 291. Further, it is possible for the first color separation element 29 to have a configuration having a polarization split element having a polarization split layer, and the reflecting prism 292. Even when a polarization split element which, for example, transmits the green light beam GLs2 having entered the polarization split element toward the +Z direction, and reflects the blue light beam BLp in the −Y direction toward the reflecting prism 292 is adopted instead of the dichroic prism 291 in the first color separation element 29, it is possible to separate the blue light beam BLp and the green light beam GLs2 from each other similarly to the first color separation element 29 having the dichroic prism 291.

The reflecting prism 292 is disposed at the −Y direction side of the dichroic prism 291. The blue light beam BLp reflected by the color separation layer 2911 enters the reflecting prim 292. The reflecting prism 292 is a prism type reflecting element formed by combining two base members each having a substantially isosceles right triangular prismatic shape with each other to form a substantially rectangular solid shape. On the interface between the two base members, there is disposed a reflecting layer 2921. The reflecting layer 2921 is tilted 45° with respect to the +y direction and the +Z direction. In other words, the reflecting layer 2921 is tilted 45° with respect to the X-Y plane and the X-Z plane. In other words, the reflecting layer 2921 and the color separation layer 2911 are arranged in parallel to each other.

The blue light beam BLp which enters the reflecting layer 2921 in the −Y direction from the dichroic prism 291 is reflected toward the +Z direction by the reflecting layer 2921. The blue light beam BLp reflected by the reflecting layer 2921 is emitted from the reflecting prism 292 toward the +Z direction. It should be noted that it is possible to adopt a reflecting mirror having the reflecting layer 2921 instead of the reflecting prism 292.

Configuration of Sixth Retardation Element

The sixth retardation element 30 is disposed at the +z direction side of the dichroic prism 291. In other words, the sixth retardation element 30 is disposed on the light path of the green light beam GLs2 emitted from the dichroic prism 291. The sixth retardation element 30 is formed of a ½ wave plate with respect to the green wavelength band. The sixth retardation element 30 converts the green light beam GLs2 which enters the sixth retardation element 30 from the dichroic prism 291 into the green light beam GLp2 as P-polarized light. The green light beam GLp2 obtained by the conversion into the P-polarized light by the sixth retardation element 30 is emitted toward the +Z direction from the light source device 2, and then enters the homogenization device 4 shown in FIG. 1. It should be noted that the sixth retardation element 30 can be disposed so as to have contact with a surface of the dichroic prism 291 from which the green light beam GLs2 is emitted.

The green light beam GLp2 is spatially separated from the blue light beam BLp, and is emitted from an exit position different from an exit position of the blue light beam BLp in the light source device 2, and then enters the homogenization device 4. In particular, the green light beam GLp2 is emitted from the exit position distant toward the +Y direction from the exit position of the blue light beam BLp in the light source device 2, and then enters the homogenization device 4.

Configuration of Second Color Separation Element

Figure 7:
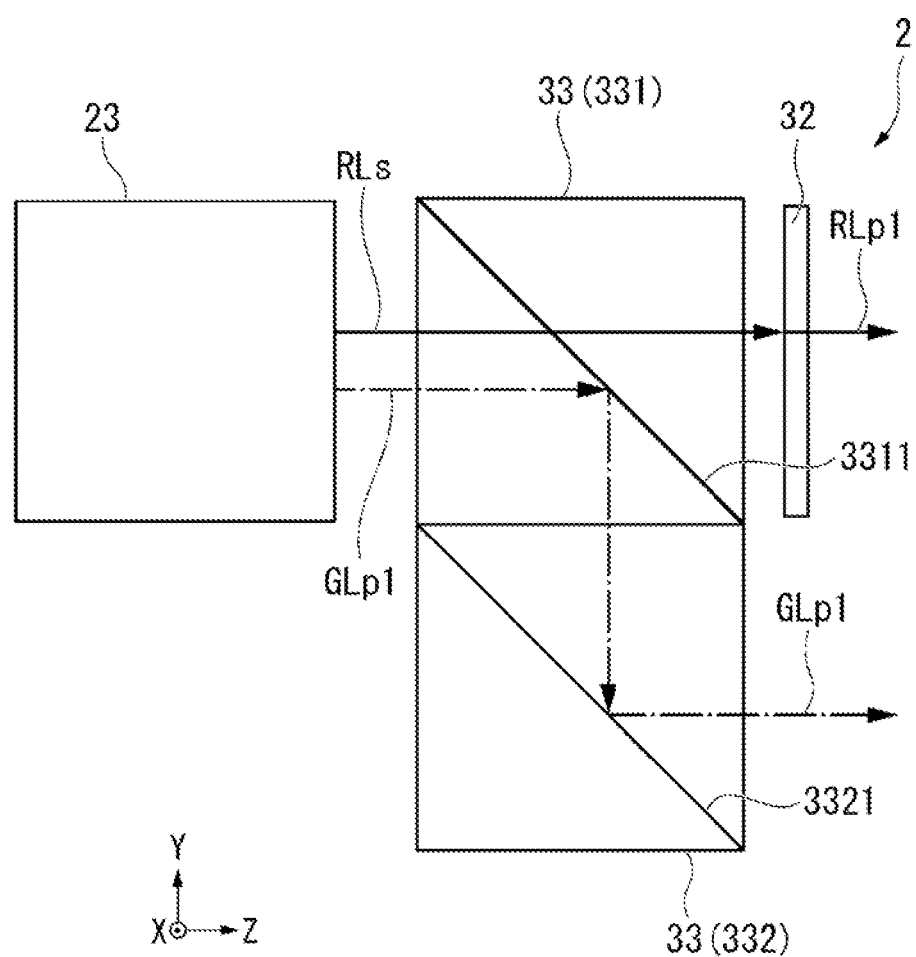
FIG. 7 is a side view of the light source device viewed from a +X direction.

FIG. 7 is a side view of the light source device 2 viewed from the +X direction. In other words, FIG. 7 shows the seventh retardation element 32 and the second color separation element 33 viewed from the +X direction. It should be noted that in FIG. 7, an illustration of the second diffusion device 36, the second light collection element 35, the first diffusion device 26, and so on is omitted.

As shown in FIG. 7, the second color separation element 33 is disposed at the +Z direction side of the second optical member 23. The second color separation element 33 has a dichroic prism 331 and a reflecting prism 332. The dichroic prism 331 and the reflecting prism 332 are arranged side by side along the Y axis. The second color separation element 33 separates the light emitted toward the +Z direction from the second optical member 23 into the green light beam GLp1 and the red light beam RLs.

The dichroic prism 331 is formed of a prism type color separation element similarly to the dichroic prism 291. On the interface between the two base members, there is disposed a color separation layer 3311. The color separation layer 3311 is tilted 45° with respect to the +Y direction and the +Z direction. In other words, the color separation layer 3311 is tilted 45° with respect to the X-Y plane and the X-Z plane. The color separation layer 3311 and the reflecting layer 3321 are arranged in parallel to each other.

The color separation layer 3311 functions as a dichroic mirror for reflecting the green light, and transmitting the red light out of the incident light. Therefore, the red light beam RLs out of the light having entered the dichroic prism 331 from the second optical member 23 is transmitted through the color separation layer 3311 toward the +Z direction to be emitted outside the dichroic prism 331.

In contrast, the green light beam GLp1 out of the light having entered the dichroic prism 331 from the second optical member 23 is reflected toward the −Y direction by the color separation layer 3311. In the case of the present embodiment, the green light beam GLp1 is the S-polarized light with respect to the color separation layer 3311 of the dichroic prism 331, and the red light beam RLs is the P-polarized light with respect to the color separation layer 3311 of the dichroic prism 331. In other words, the color separation layer 3311 for performing transmission and reflection in accordance with the wavelength band in the present embodiment reflects the green light beam GLp1 which enters the color separation layer 3311 as S-polarized light, and transmits the red light beam RLs which enters the color separation layer 3311 as P-polarized light. Since it is easy to reflect the S-polarized light and transmit the P-polarized light in a general optical film, it is easy to make the film design of the color separation layer 3311 in the present embodiment which is designed to transmit the P-polarized light and reflect the S-polarized light as described above.

It should be noted that it is possible to use a dichroic mirror having the color separation layer 3311 instead of the dichroic prism 331.

The reflecting prism 332 is disposed at the −Y direction side of the dichroic prism 331. The reflecting prism 332 has substantially the same configuration as the reflecting prism 292. Specifically, the reflecting prism 332 has the reflecting layer 3321 which is parallel to the color separation layer 3311, and the reflecting layer 2921.

The green light beam GLp which is reflected by the color separation layer 3311, and then enters the reflecting layer 3321 is reflected by the reflecting layer 3321 toward the +Z direction. The green light beam GLp having been reflected by the reflecting layer 3321 is emitted outside the reflecting prism 332. It should be noted that it is possible to adopt a reflecting mirror having the reflecting layer 3321 instead of the reflecting prism 332.

Configuration of Seventh Retardation Element

The seventh retardation element 32 is disposed at the +Z direction side of the dichroic prism 331. In other words, the seventh retardation element 32 is disposed on the light path of the red light beam RLs emitted from the dichroic prism 331. The seventh retardation element 32 is formed of a ½ wave plate with respect to the red wavelength band. The seventh retardation element 32 converts the red light beam RLs which enters the seventh retardation element 32 from the dichroic prism 331 into the red light beam RLp1 as P-polarized light. The red light beam RLp1 which has been converted by the seventh retardation element 32 into the P-polarized light is emitted toward the +Z direction from the light source device 2, and then enters the homogenization device 4 shown in FIG. 1. It should be noted that the seventh retardation element 32 can be disposed so as to have contact with a surface of the dichroic prism 331 from which the red light beam RLs is emitted.

The red light beam RLp1 is spatially separated from the green light beam GLp1, and is emitted from an exit position different from an exit position of the green Light beam GLp1 in the light source device 2, and then enters the homogenization device 4. In other words, the red light beam RLp1 is spatially separated from the blue light beam BLp, the green light beam GLp1, and the green light beam GLp2, and is emitted from a position different from those of the blue light beam BLp, the green light beam GLp1, and the green light beam GLp2, and then enters the homogenization device 4. In other words, the red light beam RLp1 is emitted from the exit position which is distant toward the +Y direction from the exit position of the green light beam GLp1 in the light source device 2, and is distant toward the +X direction from the exit position of the green light beam GLp2, and then enters the homogenization device 4.

Configuration of Homogenization Device

As shown in FIG. 1, the homogenization device 4 homogenizes the illuminance in the image formation area of the light modulation device 6 irradiated with the light beams emitted from the light source device 2. The homogenization device 4 has a first multi-lens 41, a second multi-lens 42, and a superimposing lens 43.

The first multi-lens 41 has a plurality of lenses 411 arranged in a matrix in a plane perpendicular to a central axis of the light L entering the first multi-lens 41 from the light source device 2, namely the illumination light axis Ax. The first multi-lens 41 divides the light entering the first multi-lens 41 from the light source device 2 into a plurality of partial light beams with the plurality of lenses 411.

Figure 8:
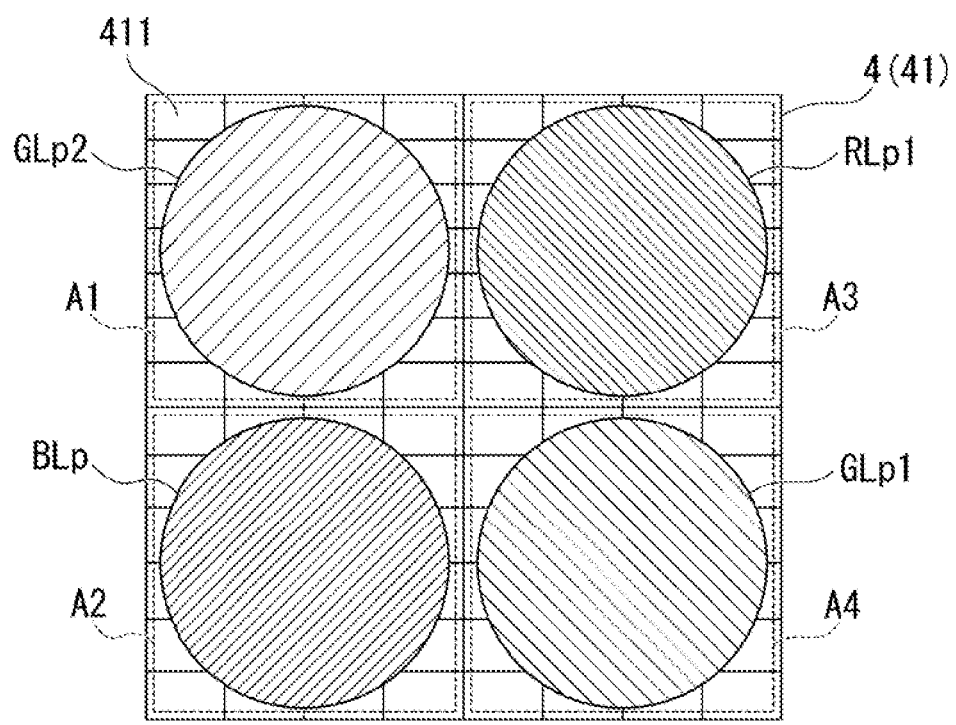
FIG. 8 is a schematic diagram showing positions of incidence of colored light beams on a multi-lens.

FIG. 8 is a schematic diagram showing positions of incidence of the respective colored light beams in the first multi-lens 41 viewed from the −Z direction.

As shown in FIG. 8, the green light beam GLp2, the blue light beam BLp, the red light beam RLp1, and the green light beam GLp1 emitted from the light source device 2 enter the first multi-lens 41. The green light beam GLp2 emitted from the position at the −X direction side and at the +Y direction side in the light source device 2 enters the plurality of lenses 411 included in an area A1 located at the −X direction side and at the +Y direction side in the first multi-lens 41.

Further, the blue light beam BLp emitted from the position at the −X direction side and at the −Y direction side in the light source device 2 enters the plurality of lenses 411 included in an area A2 located at the −X direction side and at the −Y direction side in the first multi-lens 41.

The red light beam RLp1 emitted from the position at the +X direction side and at the +Y direction side in the light source device 2 enters the plurality of lenses 911 included in an area A3 located at the +X direction side and at the +Y direction side in the first multi-lens 41. The green light beam GLp1 emitted from the position at the +X direction side and at the -Y direction side in the light source device 2 enters the plurality of lenses 411 included in an area A4 located at the +X direction side and at the -Y direction side in the first multi-lens 41. Each of the colored light beams having entered the lenses 411 turns to a plurality of partial light beams, and enters lenses 421 corresponding respectively to the lenses 411 in the second multi-lens 42.

As shown in FIG. 1, the second multi-lens 42 has the plurality of lenses 421 which is arranged in a matrix in a plane perpendicular the illumination light axis Ax, and at the same time, corresponds respectively to the plurality of lenses 411 of the first multi-lens 41. The plurality of partial light beams emitted from the lenses 411 corresponding respectively to the lenses 421 enters the respective lenses 421. Each of the lenses 421 makes the partial light beam having entered the lens 921 enter the superimposing lens 43.

The superimposing lens 43 superimposes the plurality of partial light beams entering the superimposing lens 43 from the second multi-lens 42 on each other in the image formation area of the light modulation device 6. In particular, the second multi-lens 42 and the superimposing lens 43 make the green light beam GLp1, the blue light beam BLp, the red light beam RLp1, and the green light beam GLp2 each divided into the plurality of partial light beams enter a plurality of microlenses 621 constituting a microlens array 62 described later of the light modulation device 6 at respective angles different from each other via the field lens 5.

Configuration of Light Modulation Device

As shown in FIG. 1, the light modulation device 6 modulates the light beams emitted from the light source device 2. In particular, the light modulation device 6 modulates each of the colored light beams which are emitted from the light source device 2, and then enter the light modulation device 6 via the homogenization device 4 and the field lens 5 in accordance with image information to form the image light corresponding to the image information. The light modulation device 6 is provided with the single liquid crystal panel 61 and the single microlens array 62.

Configuration of Liquid Crystal Panel

Figure 9:
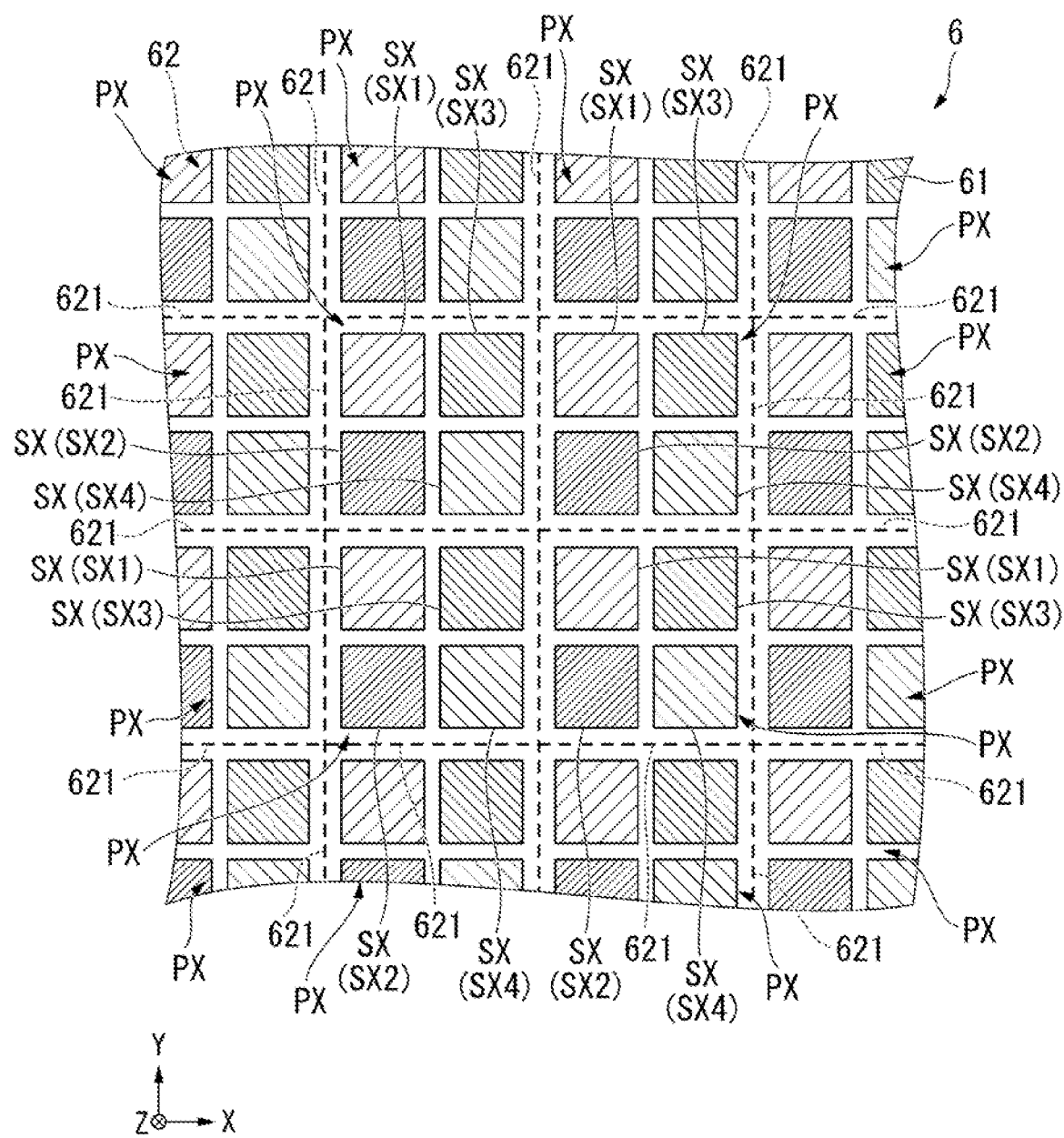
FIG. 9 is an enlarged view of a light modulation device.

FIG. 9 is a schematic enlarged view of a part of the light modulation device 6 viewed from the -Z direction. In other words, FIG. 9 shows a correspondence relationship between the pixels PX provided to the liquid crystal panel 61 and the microlenses 621 provided to the microlens array 62.

As shown in FIG. 9, the liquid crystal panel 61 has the plurality of pixels PX arranged in a matrix in a plane perpendicular to the illumination light axis Ax.

One pixel PX has a plurality of sub-pixels SX for respectively modulating colored light beams different in color from each other. In the present embodiment, one of the pixels PX has four sub-pixels. SX (SX1 through SX4). Specifically, in one pixel PX, the first sub-pixel SX1 is disposed at a position at the -X direction side and at the +Y direction side. The second sub-pixel SX2 is disposed at a position at the -X direction side and at the -Y direction side. The third sub-pixel SX3 is disposed at a position at the +X direction side and at the +Y direction side. The fourth sub-pixel SX4 is disposed at a position at the +X direction side and at the -Y direction side.

Configuration of Microlens Array

As shown in FIG. 1, the microlens array 62 is disposed at the -Z direction side as the side of incidence of light with respect to the liquid crystal panel 61. The microlens array 62 guides the colored light beams entering the microlens array 62 to the individual pixels PX. The microlens array 62 has the plurality of microlenses 621 corresponding to the plurality of pixels PX.

As shown in FIG. 9, the plurality of microlenses 621 is arranged in a matrix in a plane perpendicular to the illumination light axis Ax. In other words, the plurality of microlenses 621 is arranged in a matrix in an orthogonal plane with respect to the central axis of the light entering the plurality of microlenses 621 from the field lens 5.

In the present embodiment, one microlens 621 is disposed so as to correspond to the two sub-pixels arranged in the +X direction and the two sub-pixels arranged in the +Y direction. In other words, one microlens 621 is disposed so as to correspond to the four sub-pixels SX1 through SX4 arranged in a 2×2 matrix in the X-Y plane.

The green light beam GLp2, the blue light beam BLp, the red light beam RLp1, and the green light beam GLp1 each superimposed by the homogenization device 4 enter the microlenses 621 at respective angles different from each other. The microlenses 621 make the colored light beams entering the microlens 621 enter the sub-pixels SX corresponding to the colored light beams. Specifically, the microlens 621 makes the green light beam GLp2 enter the first sub-pixel SX1 out of the sub-pixels SX of the pixel PX corresponding to the microlens 621, makes the blue light beam BLp enter the second sub-pixel SX2, makes the red light beam RLp1 enter the third sub-pixel SX3, and makes the green light beam GLp1 enter the fourth sub-pixel SX4. Thus, the colored light beams corresponding respectively to the sub-pixels 3X1 through SX4 enter the respective sub-pixels SX1 through SX4, and the colored light beams are respectively modulated by the corresponding sub-pixels SX1 through SX4. In such a manner, the image light modulated by the liquid crystal panel 61 is projected by the projection optical device 7 on the projection target surface not shown.

Advantages of First Embodiment

In the related-art projectors, there has been known a projector provided with a light source made of a lamp. Since the light emitted from the lamp is not uniform in polarization direction, in order to use the liquid crystal panel as the light modulation device, a polarization conversion device for uniformizing the polarization direction becomes necessary. For the projector, there is generally used the polarization conversion device provided with a multi-lens array and a polarization split element (PBS) array. However, in order to reduce the size of the projector, there are required the multi-lens array and the PBS array narrow in pitch, but it is extremely difficult to manufacture the PBS array narrow in pitch.

To cope with this problem, in the present embodiment, the plurality of colored light beams uniform in the polarization direction, namely the green light beam GLp2 as P-polarized light, the blue light beam BLp as P-polarized light, the red light beam RLp1 as P-polarized light, and the green light beam GLp1 as P-polarized light, are emitted from the light source device 2. According to this configuration, it is possible to realize the light source device 2 capable of emitting the plurality of light beams spatially separated from each other and uniformed in the polarization direction without using the polarization conversion element narrow in pitch described above. Thus, it becomes possible to reduce the light source device 2 in size, and thus, it is possible to achieve reduction in size of the projector 1.

Further, the light source device 2 according to the present embodiment is provided with the light source unit 21 for emitting the red light beams RLp, the green light beams GLs, and the blue light beams BLs. Further, there is provided the first optical member 22 for transmitting the red light beams RLp and the green light beams GLp as P-polarized light toward the +X direction, and reflecting the blue light beam BLs as S-polarized light toward the −Z direction out of the red light beams, the green light beams, and the blue light beams which enter the first optical member 22 along the +X direction from the light source section 21. Further, there is provided the second optical member 23 which is disposed at the +X direction side of the first optical member 22, and which transmits the red light beams RLp toward the +X direction and reflects the green light beams GLs toward the −Z direction out of the red light beams and the green light beams entering the second optical member 23 along the +X direction from the first optical member 22. Further, there is provided the first retardation element 31 which is disposed between the first optical member 22 and the second optical member 23, and which provides the phase difference to the light in the green wavelength band. Further, there is provided the first diffusion element 261 which is disposed at the −Z direction side of the first optical member 22, and which diffuses the blue light beans BLc1 entering the first diffusion element 261 along the −Z direction from the first optical member 22, and emits the result toward the +Z direction. Further, there is provided the second diffusion element 262 which is disposed at the −Z direction side of the second optical member 23, and which diffuses the green light beams GLc1 entering the second diffusion element 262 along the −Z direction from the second optical member 23, and emits the result toward the +Z direction. Further, there is provided the third diffusion element 363 which is disposed at the +X direction side of the second optical member 23, and which diffuses the red light beams RLc1 entering the third diffusion element 363 along the +X direction from the second optical member 23, and emits the result toward the −X direction. The red light beam RLs which enters the second optical member 23 along the −X direction from the third diffusion element 363 is reflected by the second optical member 23 toward the +Z direction, a part of the green light beam GLp as P-polarized light which enters the second optical member 23 along the +Z direction from the second diffusion element 262 is transmitted by the second optical member 23 toward the +Z direction, and another part of the green light beam GLp as P-polarized light is reflected by the second optical member 22 toward the −X direction. The first retardation element 31 converts the green light beams GLp as P-polarized light which enter the first retardation element 31 along the +X direction from the first optical member 22 into the green light beams GLs as S-polarized light, and converts another part of the green light beam GLp as P-polarized light which enters the first retardation element 31 along the −X direction from the second optical member 23 into the green light beam GLs2 as S-polarized light.

The first optical member 22 transmits the blue light beam BLp which enters the first optical member 22 along the +Z direction from the first diffusion element 261, and reflects the green light beam GLs2 as S-polarized light which enters the first optical member 22 along the −X direction from the first retardation element 31.

While in the light source device in Document 1, the wavelength conversion element is required in addition to the diffusion device, in the light source device 2 according to the present embodiment, it is possible to emit the red light beams RLp, the green light beams GLp1, GLp2, and the blue light beams BLp only by using the light source unit 21 without using the wavelength conversion element. Thus, according to the configuration of the present embodiment, it is possible to achieve the reduction in size of the light source device 2 compared to Document 1.

In the light source device 2 according to the present embodiment, there is further provided the second retardation element 24 which is disposed between the first optical member 22 and the first diffusion element 261, and which the blue light beams BLs as S-polarized light enter from the first optical member 22.

According to this configuration, since the second retardation element 24 is disposed between the first optical member 22 and the first diffusion element, it is possible to convert the blue light beam BLc2 as circularly polarized light emitted from the first diffusion element 261 into the blue light beam BLp as P-polarized light to be transmitted through the first optical member 22. Thus, it is possible to increase the use efficiency of the blue light beam BLc2 emitted from the first diffusion element 261.

The light source device 2 according to the present embodiment is further provided with the third retardation element 37 which is disposed between the second optical member 23 and the second diffusion element 262, and which the green light beams GLs as S-polarized light enter from the second optical member 23.

According to this configuration, it is possible to convert the green light beam GLc2 as circularly polarized light emitted from the second diffusion element 262 into the green light beam GLp as P-polarized light using the third retardation element 37, and transmit a part of the green light beam GLp and reflect another part thereof in the second optical member 23. Thus, it is possible to increase the use efficiency of the green light beam GLc2 emitted from the second diffusion element 262.

The light source device 2 according to the present embodiment is further provided with the fourth retardation element 34 which is disposed between the second optical member 23 and the third diffusion element 363, and which the red light beams RLp as P-polarized light enter from the second optical member 23.

According to this configuration, it is possible to convert the red light beam RLc2 as circularly polarized light emitted from the third diffusion element 363 into the red light beam RLs as S-polarized light using the fourth retardation element 34, and reflect the red light beam RLs in the second optical member 23. Thus, it is possible to increase the use efficiency of the red light beam RLc2 emitted from the third diffusion element 363.

In the light source device 2 according to the present embodiment, the light source unit 21 has the support member 210, the first light emitting elements 211 which are provided to the support member 210, and emit the red light beams RLp, the second light emitting elements 212 which are provided to the support member 210, and emit the green light beams GLs, and the third light emitting elements 213 which are provided to the support member 210, and emit the blue light beams BLs.

According to this configuration, the first light emitting elements 211, the second light emitting elements 212, and the third light emitting elements 213 for emitting colored light beams of the three colors different from each other are provided to the common support member 210. Thus, it becomes easy to cool, for example, the light source unit 21, and thus, it is possible to realize the light source unit 21 small in size. Therefore, reduction in size of the light source device 2 can be achieved. In particular, when using the semiconductor laser as each of the light emitting elements 211, 212, and 213, it is possible to realize the light source device 2 wide in color gamut, and small in etendue.

In the light source device 2 according to the present embodiment, the first light beam emitted from the first light emitting element 211 is the red light beam RLp as P-polarized light, the second light beam emitted from the second light emitting element 212 is the green light beam GLs as S-polarized light, and the third light beam emitted from the third light emitting element 213 is the blue light beam BLs as S-polarized light. Further, the light source device 2 according to the present embodiment is further provided with the fifth retardation element 28 which is disposed between the second light emitting elements 212 and the first optical element 22, and converts the green light beams GLs as S-polarized light emitted from the second light emitting elements 212 into the green light beams GLp as P-polarized light.

According to this configuration, as described above, when the semiconductor laser is used as each of the light emitting elements, since the polarization direction of the blue light beam BLs and the green light beam GLs and the polarization direction of the red light beam RLp are perpendicular to each other due to a difference in constituent material, it is possible to realize the polarization directions described above only by arranging all of the semiconductor lasers of the respective colors in the same orientation in the light source unit 21. Further, since the fifth retardation element 28 converts the polarization direction of the green light beams GLs into the P-polarized light, it is possible to separate the green light beams GLp and the red light beams RLp, and the blue light beams BLs from each other with the first optical member 22.

The light source device 2 according to the present embodiment is further provided with the first substrate 260 having the first surface 260a, and the first rotary device 263 for rotating the first substrate 260 centering on the first rotational axis R1 crossing the first surface 260a. The first diffusion element 261 is disposed so as to form the ring-like shape centering on the first rotational axis R1 on the first surface 260a of the first substrate 260, the second diffusion element 262 is disposed so as to form the zing-like shape centering on the first rotational axis R1 on the first surface 260a of the first substrate 260, and the distance from the first rotational axis R1 to the first diffusion element 261 and the distance from the first rotational axis R1 to the second diffusion element 262 are different from each other.

According to this configuration, due to the rotation of the first substrate 260, the position of incidence of the light in each of the first diffusion element 261 and the second diffusion element 262 temporally changes. Therefore, when the semiconductor laser is used as, for example, each of the light emitting elements, it is possible to effectively suppress the speckle which is apt to occur in the laser beam. Further, since the first diffusion element 261 and the second diffusion element 262 are concentrically disposed on the common first substrate 260, the configuration of the light source device 2 becomes simple, and it is possible to achieve the reduction in size of the light source device 2 compared to when disposing the diffusion elements 261, 262 on individual substrates.

The light source device 2 according to the present embodiment is further provided with the second substrate 361 having the second surface 361a, and the second rotary device 362 for rotating the second substrate 361 centering on the second rotational axis R2 crossing the second surface 361a. The third diffusion element 363 is disposed so as to form a ring-like shape centering on the second rotational axis R2 on the second surface 361a of the second substrate 361.

According to this configuration, due to the rotation of the second substrate 361, the position of incidence of the light in the third diffusion element 363 temporally changes. Therefore, when the semiconductor laser is used as, for example, the light emitting element, it is possible to effectively suppress the speckle which is apt to occur in the laser beam. The speckle is particularly apt to occur in the red light beam out of the three colored light beams. From this point of view, according to this configuration, since the second substrate 361 provided with the third diffusion element 363 for diffusing the red light beam RLc1 is disposed separately from the first substrate 260 provided with the diffusion elements 261, 262 for diffusing other colored light beams, it is possible to more effectively suppress the speckle in the red light beam by, for example, adjusting the rotational speed of the second substrate 361.

The light source device 2 according to the present embodiment is further provided with the first color separation element 29 which is disposed at the +Z direction side of the first optical member 22, and separates the light emitted from the first optical member 22 into the blue light beam BLp and the green light beam GLs2, and the second color separation element 33 which is disposed at the +Z direction side of the second optical member 23, and separates the light emitted from the second optical member 23 into the red light beam RLs and the green light beam GLp1.

According to this configuration, it is possible to emit the four light beams, namely the blue light beam BLp, the green light beam GLp2, the red light beam RLp1, and the green light beam GLp1 in a separated manner from the light source device 2.

The projector 1 according to the present embodiment is provided with the light source device 2 according to the present embodiment, the light modulation device 6 for modulating the light emitted from the light source device 2 in accordance with the image information, and the projection optical device 7 for projecting the light modulated by the light modulation device 6.

According to this configuration, it is possible to configure the projector 1 of a so-called single panel type, and thus, it is possible to realize the projector 1 small in size and high in efficiency.

The projector 1 according to the present embodiment is further provided with the homogenization device 4 disposed between the light source device 2 and the light modulation device 6. The homogenization device 4 has the first multi-lens 41 and the second multi-lens 42 for dividing the light L entering the first multi-lens 41 and the second multi-lens 42 from the light source device 2 into the plurality of partial light beams, and the superimposing lens 43 for superimposing the plurality of partial light beams entering the superimposing lens 43 from the first multi-lens 41 and the second multi-lens 42 on the light modulation device 6.

According to this configuration, it is possible to substantially uniformly illuminate the light modulation device 6 with the blue light beam BLp, the green light beam GLp2, the red light beam RLp1, and the green light beam GLp1 emitted from the light source device 2.

Thus, it is possible to suppress the color unevenness and the luminance unevenness in the projection image.

In the projector 1 according to the present embodiment, the light modulation device 6 is provided with the liquid crystal panel 61 having the plurality of pixels PX, and the microlens array 62 which is provided at the side of incidence of light of the liquid crystal panel 61, and has the plurality of microlenses 621 corresponding to the plurality of pixels PX. Each of the pixels PX has the first sub-pixel SX1, the second sub-pixel SX2, the third sub-pixel SX3, and the fourth sub-pixel SX4, and the microlens 621 makes the green light beam GLp2 enter the first sub-pixel SX1, makes the blue light beam BLp enter the second sub-pixel SX2, makes the red light beam RLp1 enter the third sub-pixel SX3, and makes the green light beam GLp1 enter the fourth sub-pixel SX4.

According to this configuration, it is possible to make the colored light beams emitted from the light source device 2 efficiently enter the respective sub-pixels SX1, SX2, SX3, and SX4, and thus, it is possible to increase the use efficiency of the colored light beams.

Second Embodiment

A second embodiment of the present disclosure will hereinafter be described using FIG. 10 and FIG. 11.

A projector according to the second embodiment is substantially the same in configuration as that of the first embodiment, but is different in the configuration of the light source device from that of the first embodiment. Therefore, the description of the overall configuration of the projector will be omitted.

Figure 10:
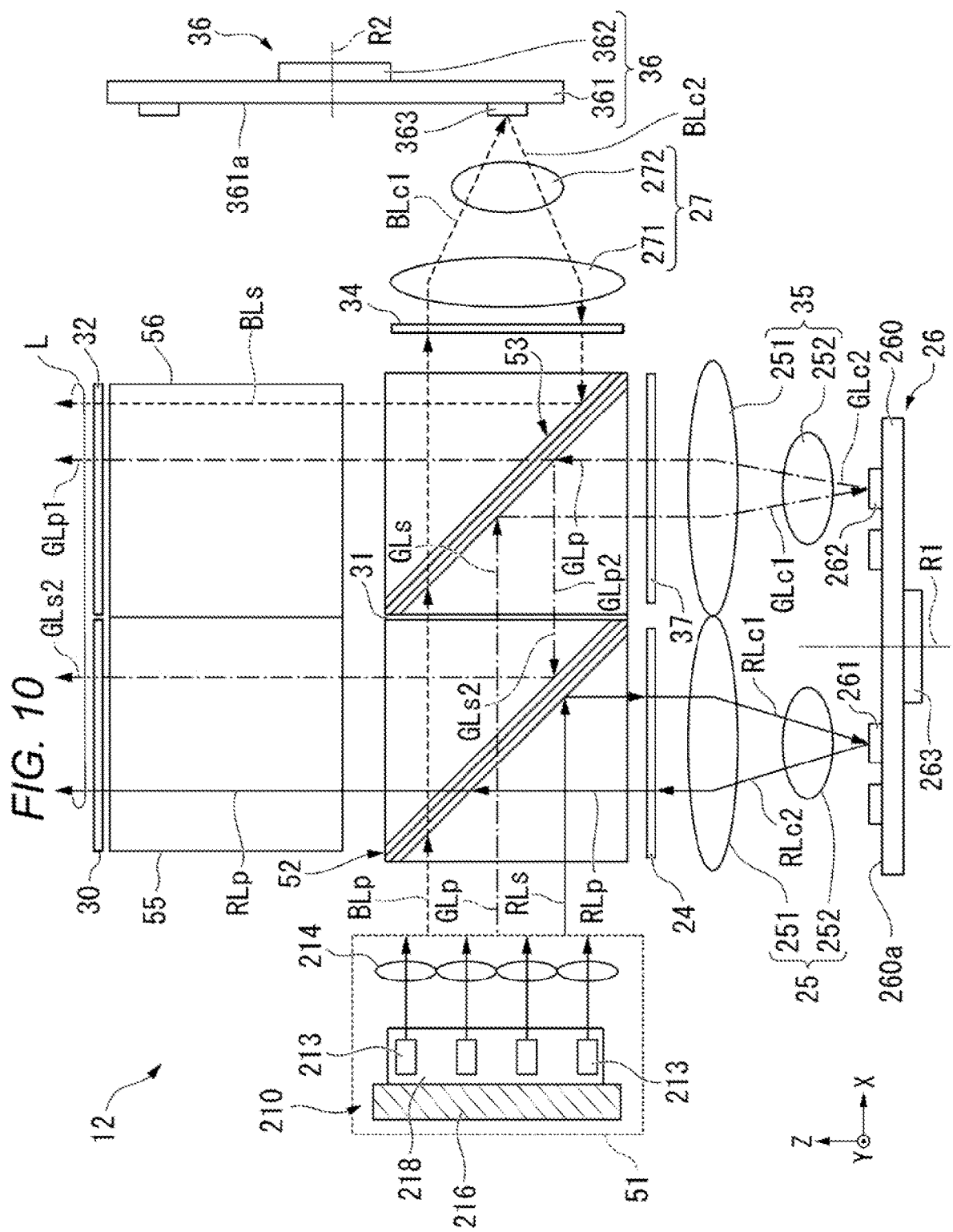
FIG. 10 is a plan view of a light source device according to a second embodiment viewed from the +Y direction.

FIG. 10 is a plan view of a light source device 12 according to the second embodiment viewed from the +Y direction. FIG. 11 is a perspective view of a light source unit 51.

Figure 11:
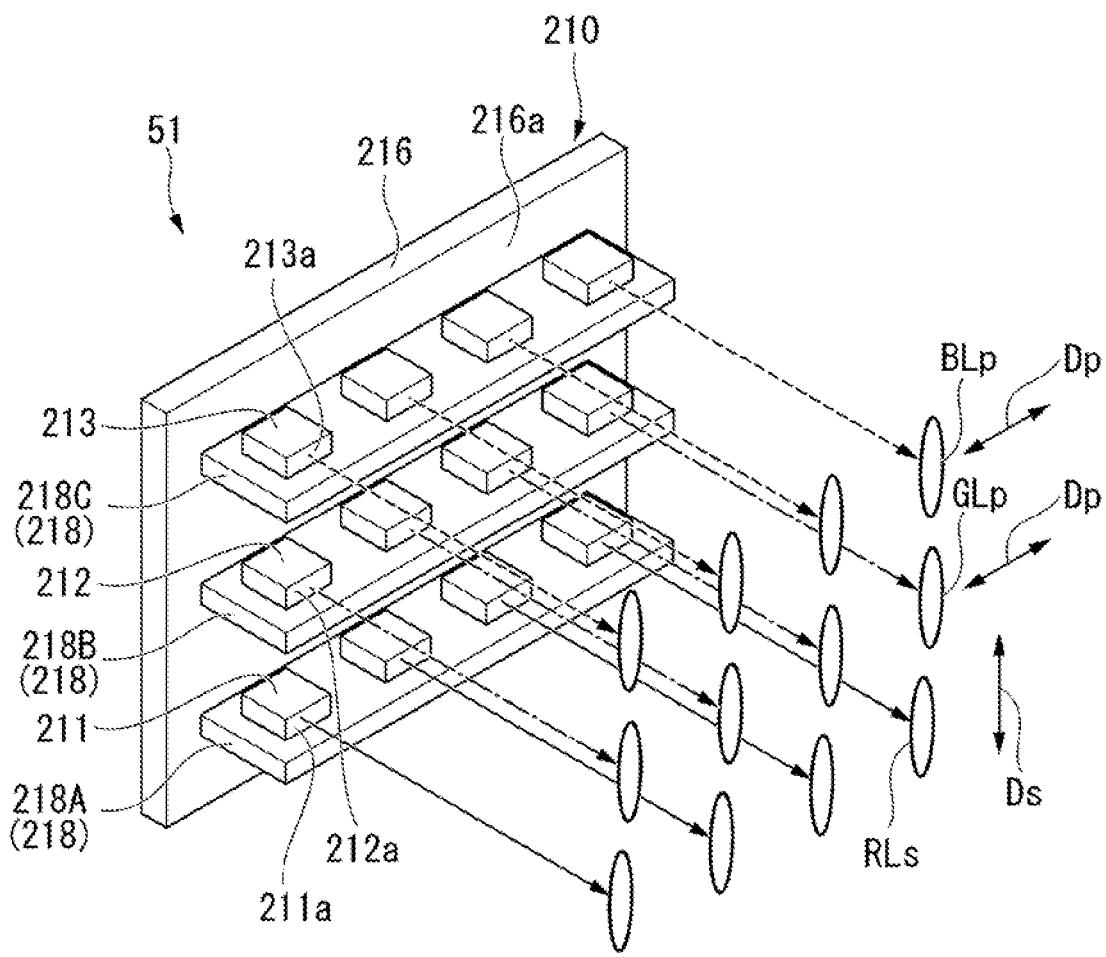
FIG. 11 is a perspective view of a light source unit.

In FIG. 10 and FIG. 11, the constituents common to the drawings used in the first embodiment are denoted by the same reference symbols, and the description thereof will be omitted.

As shown in FIG. 10, the light source device 12 is provided with the light source unit 51, a first optical member 52, the first retardation element 31, a second optical member 53, the second retardation element 24, the first light collection element 25, the third retardation element 37, the second light collection element 35, the first diffusion device 26, the fourth retardation element 34, the third light collection element 27, the second diffusion device 36, a first color separation element 55, a second color separation element 56, the sixth retardation element 30, and the seventh retardation element 32.

Configuration of Light Source Unit

As shown in FIG. 11, the light source unit 51 in the present embodiment has an arrangement obtained by rotating the light source unit 21 in the first embodiment as much as 90° centering on the X axis as the emission direction of the light. Specifically, a first sub-mount 218A is provided with the plurality of first light emitting elements 211 for emitting red light beams RLs disposed at a distance from each other along the Z axis. A second sub-mount 218B is provided with the plurality of second light emitting elements 212 for emitting green light beams GLp disposed at a distance from each other along the Z axis. A third sub-mount 218C is provided with the plurality of third light emitting elements 213 for emitting blue light beams BLp disposed at a distance from each other along the Z axis. The first sub-mount 218A, the second sub-mount 218B, and the third sub-mount 218C are disposed at a distance from each other along the Y axis.

In the case of the present embodiment, each of the first light emitting elements 211, the second light emitting elements 212, and the third light emitting elements 213 is disposed so that the short-side direction of corresponding one of the light exit surfaces 211a, 212a, and 213a is parallel to the Y-axis direction, and the longitudinal direction of corresponding one of the light exit surfaces 211a, 212a, and 213a is parallel to the Z-axis direction. Therefore, the polarization direction Dp of the blue light beams BLp and the green light beams GLp coincides with the Z axis, and the polarization direction Ds of the red light beams RLs coincides with the Y axis. In the case of the present embodiment, unlike the first embodiment, the polarization direction Dp of the blue light beams BLp and the green light beams GLp is the P-polarized light with respect to the first optical member 52 and the second optical member 53. The polarization direction Ds of the red light beams RLs is the S-polarized light with respect to the first optical member 52 and the second optical member 53. As described above, the polarization direction Dp of the blue light beams BLp and the green light beams GLp and the polarization direction Ds of the red light beams RLs are perpendicular to each other on the Y-Z plane.

The blue light beam BLp in the present embodiment corresponds to the first light beam having the first wavelength band in the appended claims. The green light beam GLp in the present embodiment corresponds to the second light beam having the second wavelength band in the appended claims. The red light beam RLs in the present embodiment corresponds to the third light beam having the third wavelength band in the appended claims.

As shown in FIG. 10, in the present embodiment, unlike the first embodiment, the fifth retardation element 28 is not disposed between the light source unit 51 and the first optical member 52. Therefore, the colored light beams emitted from the light source unit 51 enter the first optical member 52 without changing the polarization direction.

Since the configuration of each of the optical elements is substantially the same as in the first embodiment, the description thereof will hereinafter be omitted, and only the functions of the optical elements different form those of the first embodiment will hereinafter be described.

First Optical Member

The red light beams RLs as S-polarized light which enter the first optical member 52 along the +X direction from the light source unit 51 are reflected by the first optical member 52 toward the −Z direction, the green Light beams GLp as P-polarized light are transmitted by the first optical member 52 toward the +X direction, and the blue light beams BLp as P-polarized light are transmitted by the first optical member 52 toward the +X direction. Further, the red light beam RLp which enters the first optical member 52 along the +Z direction from the first diffusion element 261 is transmitted toward the +Z direction by the first optical member 52, and the green light beam GLs2 which enters the first optical member 52 along the −X direction from the second optical member 53 is reflected toward the +Z direction by the first optical member 52.

Second Optical Member

The green light beams GLs as S-polarized light which are obtained by converting the green light beams GLp as P-polarized light from the first optical member 52 into S-polarized light with the first retardation element 31, and then enter the second optical member 53 along the +X direction are reflected by the second optical member 53 toward the −Z direction, and the blue light beams BLp as P-polarized light are transmitted by the second optical member 53 toward the +X direction. Further, the second optical member 53 transmits the green light beam GLp1 corresponding to 50% of the green light beam GLp, which enters the second optical member 53 along the +Z direction from the second diffusion element 262, toward the +Z direction, and reflects the green light beam GLp2 corresponding to 50% of the green light beam GLp toward the −X direction. Further, the blue light beam BLs which enters the second optical member 53 along the −X direction from the third diffusion element 363 is reflected by the second optical member 53 toward the +Z direction.

First Diffusion Device

The first diffusion element 261 diffuses the red light beams RLc1 as circularly polarized light which enter the first diffusion element 261 along the −Z direction from the first optical member 52 via the second retardation element 24, and then emits the result toward the +Z direction. The second diffusion element 262 diffuses the green light beams GLc1 as circularly polarized light which enter the second diffusion element 262 along the −Z direction from the second optical member 53 via the third retardation element 37, and then emits the result toward the +Z direction. The first diffusion element 261 and the second diffusion element 262 are disposed on the first substrate 260 common thereto.

Second Diffusion Device

The third diffusion element 363 diffuses the blue light beams BLc1 as circularly polarized light which enter the third diffusion element 363 along the +X direction from the second optical member 53 via the fourth retardation element 34, and then emits the result toward the −X direction. The third diffusion, element 363 is disposed on the second substrate 361.

First Color Separation Element

The first color separation element 55 separates the light which enters the first color separation element 55 along the +Z direction from the first optical member 52 into the green light beam GLs2 and the red light beam RLp. Thus, the green light beam GLs2 and the red light beam RLp are emitted from respective positions at a distance in the Y-axis direction from each other in the light source device 12.

Second Color Separation Element

The second color separation element 56 separates the light which enters the second color separation element 56 along the +Z direction from the second optical member 53 into the blue light beam BLs and the green light beam GLp1. Thus, the blue light beam BLs and the green light beam GLp1 are emitted from respective positions at a distance in the Y-axis direction from each other in the light source device 12.

The rest of the configuration of the light source device 12 is substantially the same as in the first embodiment.

Advantages of Second Embodiment

In the light source device 12 according to the present embodiment, there can also be obtained substantially the same advantages as those in the first embodiment such as the advantage that it is possible to realize the light source device 12 small in size and high in efficiency, the advantage that it is possible to effectively suppress the speckle even when using a semiconductor laser as the light emitting element, or the advantage that it is possible to realize the projector small in size and high in efficiency.

Further, in the light source device 12 according to the present embodiment, the first light beam emitted from the first light emitting element 211 is the blue light beam BLp as P-polarized light, the second light beam emitted from the second light emitting element 212 is the green light beam GLp as P-polarized light, and the third light beam emitted from the third light emitting element 213 is the red light beam RLs as S-polarized light.

According to this configuration, it is possible to separate the blue light beam BLp and the green light beam GLp, and the red light beam RLs from each other with the first optical member 52 without changing the polarization states of the colored light beams emitted from the light source unit 51. Therefore, there is no need to dispose the fifth retardation element 28 between the light source unit 51 and the first optical member 32, and it is possible to achieve simplification of the light source device 12.

It should be noted that the scope of the present disclosure is not limited to the embodiments described above, but a variety of modifications can be provided thereto within the scope or the spirit of the present disclosure. For example, although in the light source unit in the first embodiment described above, the plurality of light emitting elements for emitting the same colored light beams is provided to each of the sub-mounts, it is possible to provide one sub-mount with light emitting elements which emit respective colored light beams different from each other in a mixed manner.

Modified Example of Light Source Unit

Figure 12:
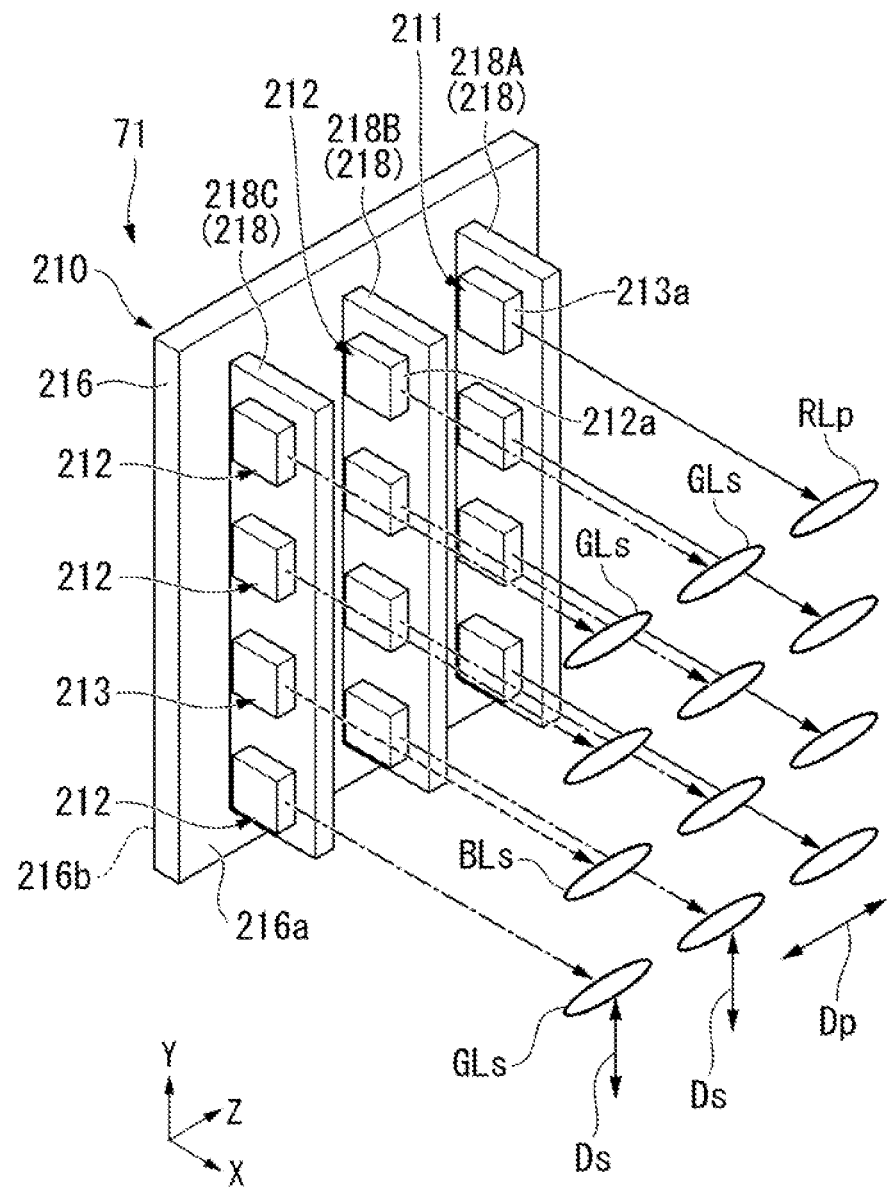
FIG. 12 is a perspective view of a light source unit in a modified example.

FIG. 12 is a perspective view of a light source unit 71 in the modified example. It should be noted that in FIG. 12, constituents common to those shown in FIG. 4 in the first embodiment are denoted by the same symbols.

As shown in FIG. 12, in the light source unit 71 in the modified example, one of the four light emitting elements provided to the third sub-mount 218C is formed of the third light emitting element 213 for emitting the blue light beam BLs, and the rest of three light emitting elements are formed of the second light emitting elements 212 for emitting the green light beams GLs. Therefore, the light source unit 71 has four first light emitting elements 211 for emitting the red light beams RLp, seven second light emitting elements 212 for emitting the green light beams GLs, and one third light emitting element 213 for emitting the blue light beam BLs. It should be noted that the numbers of the light emitting elements 211, 212, and 213 are not limited to the example described above, but can arbitrarily be modified.

According to the light source unit 71 in the modified example, it is possible to freely set the numbers of the light emitting elements 211, 212, and 213, and thus, it is possible to arbitrarily adjust the color balance of the light to be emitted from the light source device. It should be noted that it is also possible to apply the light source unit 71 in the modified example to the light source device according to the second embodiment.

Further, although in the embodiments described above, the first diffusion element and the second diffusion element are disposed on one substrate, it is also possible for the first diffusion element and the second diffusion element to be disposed respectively on individual substrates. Further, in the embodiments described above, there is provided the configuration of rotating the diffusion elements in order to suppress the speckle in the laser beam, it is possible to adopt a configuration of oscillating the diffusion elements instead of this configuration.

In any configuration, it is possible to effectively suppress the speckle by temporally changing the position of incidence of light on the diffusion element.

In each of the embodiments described above, the projector 1 is provided with the homogenization device 4 having the first multi-lens 41, the second multi-lens 42, and the superimposing lens 43. It is possible to dispose a homogenization device having other configurations instead of this configuration, or it is not required to dispose the homogenization device 4.

The light source device 2 according to the first embodiment emirs the green light beams GLp2, the blue light beams BLp, the green light beams GLp1, and the red light beams RLp uniformed into P-polarized light. Instead of this configuration, the polarization states of the colored light beams emitted by the light source device can be other polarization states. For example, it is possible for the light source device to adopt a configuration of emitting green light beams GLs, blue light beams BLs, green light beams GLs, and red light beams RLs uniformed into S-polarized Light. Further, the polarization directions of the four colored light beams are not necessarily required to be uniformed.

Besides the above, the specific descriptions of the shape, the number, the arrangement, the material, and so on of the constituents of the light source device and the projector are not limited to those of the embodiments described above, but can arbitrarily be modified. Further, although in each of the embodiments described above, there is described the example of installing the light source device according to the present disclosure in the projector using the liquid crystal light valves, the example is not a limitation. The light source device according to the present disclosure can also be applied to a projector using digital micromirror devices as the light modulation devices. Further, although in the embodiments described above, there is described the example of installing the light source device according to the present disclosure in the projector, the example is not a limitation, and can also be applied to lighting equipment, a headlight of a vehicle, and so on.

Besides the above, the specific configurations of the number, the arrangement, the shape, the material, and so on of each of the constituents constituting the projection optical device and the projector are not limited to those of the embodiments described above, but can arbitrarily be modified.

It is also possible for the light source device according to an aspect of the present disclosure to have the following configuration.

The light source device according to the aspect of the present disclosure includes a light source unit configured to emit a first light beam having a first wavelength band, a second light beam having a second wavelength band different from the first wavelength band, and a third light beam having a third wavelength band different from the first wavelength band and the second wavelength band, a first polarization split element configured to transmit the first light beam and the second light beam having a first polarization direction out of the first light beam, the second light beam, and the third light beam entering the first polarization split element along a first direction from the light source unit toward the first direction, and reflect the third light beam having a second polarization direction different from the first polarization direction toward a second direction crossing the first direction, a second polarization split element disposed at the first direction side of the first polarization split element, and configured to transmit the first light beam out of the first light beam and the second light beam, which enter the second polarization split element along the first direction from the first polarization split element, toward the first direction, and reflect the second light beam toward the second direction, a first retardation element which is disposed between the first polarization split element and the second polarization split element, and is configured to provide a phase difference to light in the second wavelength band, a first diffusion element which is disposed at the second direction side of the first polarization split element, and configured to diffuse the third light beam which enters the first diffusion element along the second direction from the first polarization split element, and emit the third light beam diffused toward a third direction as an opposite direction to the second direction, a second diffusion element which is disposed at the second direction side of the second polarization split element, and configured to diffuse the second light beam which enters the second diffusion element along the second direction from the second polarization split element, and emit the second light beam diffused toward the third direction, and a third diffusion element disposed at the first direction side of the second polarization split element, and configured to diffuse the first light beam which enters the third diffusion element along the first direction from the second polarization split element, and emit the first light beam diffused toward a fourth direction as an opposite direction to the first direction. The second polarization split element reflects the first light beam, which enters the second polarization split element along the fourth direction from the third diffusion element, toward the third direction, transmits a part of the second light beam having the first polarization direction out of the second light beam, which enters the second polarization split element along the third direction from the second diffusion element, toward the third direction, and reflects another part of the second light beam having the first polarization direction toward the fourth direction. The first retardation element converts the second light beam which enters the first retardation element along the first direction from the first polarization split element and has the first polarization direction into the second light beam having the second polarization direction, and converts the another part of the second light beam which enters the first retardation element along the fourth direction from the second polarization split element and has the first polarization direction into the second light beam having the second polarization direction. The first polarization split element transmits the third light beam which enters the first polarization split element along the third direction from the first diffusion element, and reflects the second light beam which enters the first polarization split element along the fourth direction from the first retardation element and has the second polarization direction.

The light source device according to the aspect of the present disclosure may further be provided with a second retardation element which is disposed between the first polarization split element and the first diffusion element, and which the third light beam having the second polarization direction enters from the first polarization split element.

The light source device according to the aspect of the present disclosure may further be provided with a third retardation element which is disposed between the second polarization split element and the second diffusion element, and which the second light beam having the second polarization direction enters from the second polarization split element.

The light source device according to the aspect of the present disclosure may further be provided with a fourth retardation element which is disposed between the second polarization split element and the third diffusion element, and which the first light beam having the first polarization direction enters from the second polarization split element.

In the light source device according to the aspect of the present disclosure, the light source unit may include a support member, a first light emitting element provided to the support member, and configured to emit the first light beam, a second light emitting element provided to the support member, and configured to emit the second light beam, and a third light emitting element provided to the support member, and configured to emit the third light beam.

In the light source device according to the aspect of the present disclosure, there may further be included a fifth retardation element disposed between the second light emitting element and the first polarization split element, wherein the first light beam emitted from the first light emitting element may be a red light beam having the first polarization direction, the second light beam emitted from the second light emitting element may be a green light beam having the second polarization direction, the third light beam emitted from the third light emitting element may be a blue light beam having the second polarization direction, and the fifth retardation element may be configured to convert the green light beam having the second polarization direction and emitted from the second light emitting element into the green light having the first polarization direction.

In the light source device according to the aspect of the present disclosure, the first light beam emitted from the first light emitting element may be a blue light beam having the first polarization direction, the second light beam emitted from the second light emitting element may be a green light beam having the first polarization direction, and the third light beam emitted from the third light emitting element may be a red light beam having the second polarization direction.

The light source device according to the aspect of the present disclosure may further be provided with a first substrate having a first surface, and a first rotary device configured to rotate the first substrate centering on a first rotational axis crossing the first surface, wherein the first diffusion element may be disposed so as to form a ring-like shape centering on the first rotational axis on the first surface of the first substrate, the second diffusion element may be disposed so as to form a ring-like shape centering on the first rotational axis on the first surface of the first substrate, and a distance from the first rotational axis to the first diffusion element and a distance from the first rotational axis to the second diffusion element may be different from each other.

The light source device according to the aspect of the present disclosure may further be provided with a second substrate having a second surface, and a second rotary device configured to rotate the second substrate centering on a second rotational axis crossing the second surface, wherein the third diffusion element may be disposed so as to form a ring-like shape centering on the second rotational axis on the second surface of the second substrate.

The light source device according to the aspect of the present disclosure may further be provided with a first color separation element disposed at the third direction side of the first polarization split element, and configured to separate light emitted from the first polarization split element into a third light beam having the third wavelength band and a second light beam having the second wavelength band, and a second color separation element disposed at the third direction side of the second polarization split element, and configured to separate light emitted from the second polarization split element into a first light beam having the first wavelength band and a second light beam having the second wavelength band.

A projector according to an aspect of the present disclosure may have the following configuration.

The projector according to an aspect of the present disclosure includes the light source device according to the aspect of the present disclosure, a light modulation device configured to modulate light from the light source device in accordance with image information, and a projection optical device configured to project the light modulated by the light modulation device.

The projector according to the aspect of the present disclosure may further be provided with a homogenization device disposed between the light source device and the light modulation device, wherein the homogenization device may include a pair of multi-lenses configured to divide the light entering the pair of multi-lenses from the light source device into a plurality of partial light beams, and a superimposing lens configured to superimpose the plurality of partial light beams entering the superimposing lens from the pair of multi-lenses on the light modulation device.

In the projector according to the aspect of the present disclosure, the light modulation device may include a liquid crystal panel having a plurality of pixels, and a microlens array which is disposed at a side of incidence of light of the liquid crystal panel, and has a plurality of microlenses corresponding to the plurality of pixels, the pixels may each include a first sub-pixel, a second sub-pixel, a third sub-pixel, and a fourth sub-pixel, and the microlens may make the second light beam enter the first sub-pixel, the third light beam enter the second sub-pixel, the first light beam enter the third sub-pixel, and the second light beam enter the fourth sub-pixel.

Further, the light source device according to an aspect of the present disclosure includes a light source unit configured to emit a first light beam, a second light beam, and a third light beam, a first polarization split element configured to transmit the first light beam and the second light beam and reflect the third light beam, a second polarization split element configured to transmit the first light beam and reflect the second light beam, a first retardation element, a first diffusion element configured to diffuse the third light beam, a second diffusion element configured to diffuse the second light beam, and a third diffusion element configured to diffuse the first light beam. The second polarization split element reflects the first light beam from the third diffusion element, transmits a part of the second light beam from the second diffusion element, and reflects another part of the second light beam from the second diffusion element. The first retardation element converts a polarization direction of the second light beam from the first polarization split element, and converts a polarization direction of the another part of the second light beam from the second polarization split element. The first polarization split element transmits the third light from the first diffusion element, and reflects the second light beam from the first retardation element.

What is claimed is:

1. A light source device comprising:
    a light source unit configured to emit a first light beam having a first wavelength band, a second light beam having a second wavelength band different from the first wavelength band, and a third light beam having a third wavelength band different from the first wavelength band and the second wavelength band;
    a first polarization split element configured to transmit the first light beam and the second light beam having a first polarization direction out of the first light beam, the second light beam, and the third light beam entering the first polarization split element along a first direction from the light source unit toward the first direction, and reflect the third light beam having a second polarization direction different from the first polarization direction toward a second direction crossing the first direction;
    a second polarization split element disposed at the first direction side of the first polarization split element, and configured to transmit the first light beam out of the first light beam and the second light beam, which enter the second polarization split element along the first direction from the first polarization split element, toward the first direction, and reflect the second light beam toward the second direction;

a first retardation element which is disposed between the first polarization split element and the second polarization split element, and is configured to provide a phase difference to light in the second wavelength band;

a first diffusion element which is disposed at the second direction side of the first polarization split element, and configured to diffuse the third light beam which enters the first diffusion element along the second direction from the first polarization split element, and emit the third light beam diffused toward a third direction as an opposite direction to the second direction;

a second diffusion element which is disposed at the second direction side of the second polarization split element, and configured to diffuse the second light beam which enters the second diffusion element along the second direction from the second polarization split element, and emit the second light beam diffused toward the third direction; and a third diffusion element disposed at the first direction side of the second polarization split element, and configured to diffuse the first light beam which enters the third diffusion element along the first direction from the second polarization split element, and emit the first light beam diffused toward a fourth direction as an opposite direction to the first direction, wherein the second polarization split element reflects the first light beam, which enters the second polarization split element along the fourth direction from the third diffusion element, toward the third direction, transmits a part of the second light beam having the first polarization direction out of the second light beam, which enters the second polarization split element along the third direction from the second diffusion element, toward the third direction, and reflects another part of the second light beam having the first polarization direction toward the fourth direction, the first retardation element converts the second light beam which enters the first retardation element along the first direction from the first polarization split element and has the first polarization direction into the second light beam having the second polarization direction, and converts the another part of the second light beam which enters the first retardation element along the fourth direction from the second polarization split element and has the first polarization direction into the second light beam having the second polarization direction, and the first polarization split element transmits the third light beam which enters the first polarization split element along the third direction from the first diffusion element, and reflects the second light beam which enters the first polarization split element along the fourth direction from the first retardation element and has the second polarization direction.

2. The light source device according to claim 1, further comprising:
a second retardation element which is disposed between the first polarization split element and the first diffusion element, and which the third light beam having the second polarization direction enters from the first polarization split element.

3. The light source device according to claim 1, further comprising:
a third retardation element which is disposed between the second polarization split element and the second diffusion element, and which the second light beam having the second polarization direction enters from the second polarization split element.

4. The light source device according to claim 1, further comprising:
a fourth retardation element which is disposed between the second polarization split element and the third diffusion element, and which the first light beam having the first polarization direction enters from the second polarization split element.

5. The light source device according to claim 1, wherein the light source unit includes
a support member,
a first light emitting element provided to the support member, and configured to emit the first light beam,
a second light emitting element provided to the support member, and configured to emit the second light beam, and
a third light emitting element provided to the support member, and configured to emit the third light beam.

6. The light source device according to claim 5, further comprising:
a fifth retardation element disposed between the second light emitting element and the first polarization split element, wherein
the first light beam emitted from the first light emitting element is a red light beam having the first polarization direction,
the second light beam emitted from the second light emitting element is a green light beam having the second polarization direction,
the third light beam emitted from the third light emitting element is a blue light beam having the second polarization direction, and
the fifth retardation element is configured to convert the green light beam having the second polarization direction and emitted from the second light emitting element into the green light having the first polarization direction.

7. The light source device according to claim 5, wherein
the first light beam emitted from the first light emitting element is a blue light beam having the first polarization direction,
the second light beam emitted from the second light emitting element is a green light beam having the first polarization direction, and
the third light beam emitted from the third light emitting element is a red light beam having the second polarization direction.

8. The light source device according to claim 1, further comprising:
a first substrate having a first surface; and
a first rotary device configured to rotate the first substrate centering on a first rotational axis crossing the first surface, wherein
the first diffusion element is disposed so as to form a ring-like shape centering on the first rotational axis on the first surface of the first substrate,
the second diffusion element is disposed so as to form a ring-like shape centering on the first rotational axis on the first surface of the first substrate, and
a distance from the first rotational axis to the first diffusion element and a distance from the first rotational axis to the second diffusion element are different from each other.

9. The light source device according to claim 1, further comprising:
- a second substrate having a second surface; and
- a second rotary device configured to rotate the second substrate centering on a second rotational axis crossing the second surface, wherein
- the third diffusion element is disposed so as to form a ring-like shape centering on the second rotational axis on the second surface of the second substrate.

10. The light source device according to claim 6, further comprising:
- a first color separation element disposed at the third direction side of the first polarization split element, and configured to separate light emitted from the first polarization split element into a third light beam having the third wavelength band and a second light beam having the second wavelength band; and
- a second color separation element disposed at the third direction side of the second polarization split element, and configured to separate light emitted from the second polarization split element into a first light beam having the first wavelength band and a second light beam having the second wavelength band.

11. A projector comprising:
- the light source device according to claim 10;
- a light nodulation device configured to modulate light from the light source device in accordance with image information; and
- a projection optical device configured to project the light modulated by the light modulation device.

12. The projector according to claim 11, further comprising:
- a homogenization device disposed between the light source device and the light modulation device, wherein
- the homogenization device includes
  - a pair of multi-lenses configured to divide the light entering the pair of multi-lenses from the light source device into a plurality of partial light beams, and
  - a superimposing lens configured to superimpose the plurality of partial light beams entering the superimposing lens from the pair of multi-lenses on the light modulation device.

13. The projector according to claim 12, wherein
the light modulation device includes a liquid crystal panel having a plurality of pixels, and a microlens array which is disposed at a light incident side of the liquid crystal panel, and has a plurality of microlenses corresponding to the plurality of pixels,
the pixels each include a first sub-pixel, a second sub-pixel, a third sub-pixel, and a fourth sub-pixel, and
the microlens makes the second light beam enter the first sub-pixel, makes the third light beam enter the second sub-pixel, makes the first light beam enter the third sub-pixel, and makes the second light beam enter the fourth sub-pixel.

\* \* \* \* \*